United States Patent
Dougall et al.

(10) Patent No.: US 7,636,306 B2
(45) Date of Patent: Dec. 22, 2009

(54) METHOD AND SYSTEM FOR SCHEDULED STREAMING OF BEST EFFORT DATA

(76) Inventors: C. J. Scott Dougall, 300 Wade Cr., Thunder Bay, Ontario (CA) P7B 6K5; P. Christien Bentz, 600 Lanark Crescent, Thunder Bay, Ontario (CA) P7A 7V6

( * ) Notice: Subject to any disclaimer, the term of this patent is extended or adjusted under 35 U.S.C. 154(b) by 780 days.

(21) Appl. No.: 11/274,371

(22) Filed: Nov. 14, 2005

(65) Prior Publication Data

US 2006/0072458 A1    Apr. 6, 2006

Related U.S. Application Data

(60) Division of application No. 10/147,010, filed on May 15, 2002, which is a continuation of application No. 09/950,927, filed on Sep. 12, 2001, now abandoned.

(51) Int. Cl.
*H04L 12/26* (2006.01)
(52) U.S. Cl. .................................. 370/230; 345/661
(58) Field of Classification Search ............... 370/230, 370/236, 395.4; 715/100, 763; 345/650, 345/661, 676
See application file for complete search history.

(56) References Cited

U.S. PATENT DOCUMENTS

| | | | |
|---|---|---|---|
| 3,692,942 A | 9/1972 | Inose et al. | 370/538 |
| 4,748,618 A | 5/1988 | Brown et al. | 370/94 |
| 4,920,534 A | 4/1990 | Adelmann et al. | 370/474 |
| 4,970,590 A | 11/1990 | Cucchi et al. | |
| 5,231,486 A | 7/1993 | Acampora et al. | 358/133 |
| 5,287,178 A | 2/1994 | Acampora et al. | 348/384 |
| 5,287,182 A | 2/1994 | Haskell et al. | 348/500 |
| 5,289,276 A | 2/1994 | Siracusa et al. | 348/467 |
| 5,333,135 A | 7/1994 | Wendorf | 370/94.1 |
| 5,361,097 A | 11/1994 | Kolczynski | 348/390 |

(Continued)

OTHER PUBLICATIONS

"The RMTP-II Protocol" B. Whetten et al., IETF Standard-Working-Draft, Internet Engineering Task Force, IETF, CH, Apr. 8, 1998, XP 015036816 ISSN: 0000-0004.

(Continued)

*Primary Examiner*—Brian D Nguyen
(74) *Attorney, Agent, or Firm*—Evan L. Kahn; Proskauer Rose LLP

(57) ABSTRACT

A system is provided for controlling the transmission of best-effort filed data or programs on channels from one of plural controllers to one or more client nodes. A program is a group of files and has program information indicating to a client node how to use the files of the program. A channel is a virtual path, wherein a client node can receive program files from different channels in a separable fashion. Channels also have channel information. Multiple controllers are provided which self configure in rank order to control the scheduled transmission of programs files on channels. Client nodes receive announcements of programs and channels from the controllers and selectively subscribe to the channels and programs. Client nodes can be instructed to positively acknowledge receipt of programs and also send back negative acknowledgements for ranges of data words in program files not received. The negative acknowledgements can be consolidated to reduce the number of packets on the network. The format of packets carrying program files and acknowledgement/negative acknowledgement messages are specified.

12 Claims, 17 Drawing Sheets

U.S. PATENT DOCUMENTS

| | | | |
|---|---|---|---|
| 5,365,272 A | 11/1994 | Siracusa | 348/426 |
| 5,371,547 A | 12/1994 | Siracusa et al. | 348/426 |
| 5,381,181 A | 1/1995 | Deiss | 348/423 |
| 5,390,174 A | 2/1995 | Jugel | |
| 5,396,492 A | 3/1995 | Lien | 370/60 |
| 5,396,497 A | 3/1995 | Veltman | 370/100.1 |
| 5,400,401 A | 3/1995 | Wasilewski | 380/9 |
| 5,410,355 A | 4/1995 | Kolczynski | 348/438 |
| 5,418,782 A | 5/1995 | Wasilewski | 370/73 |
| 5,420,866 A | 5/1995 | Wasilewski | 370/426 |
| 5,426,464 A | 6/1995 | Casavant et al. | 348/415 |
| 5,430,485 A | 7/1995 | Lankford et al. | 348/423 |
| 5,448,568 A | 9/1995 | Delpuch et al. | 372/94.2 |
| 5,457,701 A | 10/1995 | Wasilewski et al. | 371/37.1 |
| 5,457,780 A | 10/1995 | Shaw et al. | 395/165 |
| 5,459,789 A | 10/1995 | Tamer et al. | 380/20 |
| 5,467,139 A | 11/1995 | Lankford | 348/512 |
| 5,473,601 A | 12/1995 | Rosen et al. | 370/319 |
| 5,473,609 A | 12/1995 | Chaney | 370/94.1 |
| 5,475,688 A | 12/1995 | Bridgewater et al. | 370/94.1 |
| 5,475,754 A | 12/1995 | Bridgewater et al. | 380/20 |
| 5,477,236 A | 12/1995 | Nanbu | 345/145 |
| 5,483,287 A | 1/1996 | Siracusa | |
| 5,486,864 A | 1/1996 | Zdepski | |
| 5,489,947 A | 2/1996 | Cooper | 348/589 |
| 5,510,845 A | 4/1996 | Yang et al. | 348/476 |
| 5,515,106 A | 5/1996 | Chaney et al. | 348/461 |
| 5,517,250 A | 5/1996 | Hoogenboom et al. | 348/467 |
| 5,521,979 A | 5/1996 | Deiss | 380/20 |
| 5,534,914 A | 7/1996 | Flohr et al. | |
| 5,535,209 A | 7/1996 | Glasser et al. | 370/468 |
| 5,539,920 A | 7/1996 | Menand et al. | 455/5.1 |
| 5,544,161 A | 8/1996 | Bigham et al. | 370/397 |
| 5,548,532 A | 8/1996 | Menand et al. | 364/514 C |
| 5,559,999 A | 9/1996 | Maturi et al. | 395/550 |
| 5,561,791 A | 10/1996 | Mendelson et al. | 709/233 |
| 5,563,648 A | 10/1996 | Menand et al. | 348/13 |
| 5,565,923 A | 10/1996 | Zdepski | |
| 5,566,174 A | 10/1996 | Sato et al. | 370/468 |
| 5,566,208 A | 10/1996 | Balakrishnan | 375/240 |
| 5,568,403 A | 10/1996 | Deiss et al. | 364/514 R |
| 5,570,335 A | 10/1996 | Ogata et al. | 369/124 |
| 5,574,505 A | 11/1996 | Lyons et al. | 348/426 |
| 5,579,317 A | 11/1996 | Pang et al. | 370/392 |
| 5,588,025 A | 12/1996 | Strolle et al. | 375/316 |
| 5,598,415 A | 1/1997 | Nuber et al. | 370/474 |
| 5,603,058 A | 2/1997 | Belknap et al. | 710/35 |
| 5,606,539 A | 2/1997 | De Haan et al. | |
| 5,608,697 A | 3/1997 | De Haan et al. | |
| 5,617,146 A | 4/1997 | Duffield et al. | 348/460 |
| 5,619,501 A | 4/1997 | Tamer et al. | 370/99 |
| 5,621,463 A | 4/1997 | Lyons et al. | 348/387 |
| 5,640,388 A | 6/1997 | Woodhead et al. | 370/468 |
| 5,650,825 A | 7/1997 | Naimpally et al. | 348/465 |
| 5,652,627 A | 7/1997 | Allen | 348/497 |
| 5,664,091 A | 9/1997 | Keen | |
| 5,675,732 A | 10/1997 | Majeti et al. | |
| 5,691,986 A | 11/1997 | Pearlstein | 370/477 |
| 5,703,877 A | 12/1997 | Nuber et al. | 370/395 |
| 5,742,599 A | 4/1998 | Lin et al. | 370/395 |
| 5,742,623 A | 4/1998 | Nuber et al. | 714/798 |
| 5,754,783 A | 5/1998 | Mendelson et al. | 709/217 |
| 5,784,110 A | 7/1998 | Acampora et al. | |
| 5,790,176 A | 8/1998 | Craig | 348/13 |
| 5,790,543 A | 8/1998 | Cloutier | 370/395 |
| 5,796,743 A | 8/1998 | Bunting et al. | |
| 5,801,781 A | 9/1998 | Hiroshima et al. | 348/441 |
| 5,802,287 A | 9/1998 | Rostoker | |
| 5,812,529 A | 9/1998 | Czarnik | 370/245 |
| 5,835,493 A | 11/1998 | Magee et al. | 370/394 |
| 5,835,668 A | 11/1998 | Yanagihara | |
| 5,835,843 A | 11/1998 | Haddad | |
| 5,844,867 A | 12/1998 | De Haan et al. | |
| 5,852,606 A | 12/1998 | Prince et al. | |
| 5,877,812 A | 3/1999 | Krause et al. | 348/385 |
| 5,905,732 A | 5/1999 | Fimoff et al. | 370/516 |
| 5,914,962 A | 6/1999 | Fimoff et al. | 370/538 |
| 5,917,830 A | 6/1999 | Chen et al. | |
| 5,946,318 A | 8/1999 | Post | |
| 5,946,326 A | 8/1999 | Rinne | |
| 5,956,088 A | 9/1999 | Shen et al. | 370/477 |
| 5,978,542 A | 11/1999 | Ting et al. | 386/68 |
| 5,991,912 A | 11/1999 | Mao | 714/776 |
| 5,995,726 A | 11/1999 | Dillon | |
| 5,999,179 A | 12/1999 | Kekic et al. | |
| 6,002,687 A | 12/1999 | Magee et al. | |
| 6,021,433 A | 2/2000 | Payne et al. | |
| 6,025,485 A | 2/2000 | Kamb et al. | |
| 6,044,396 A | 3/2000 | Adams | 709/217 |
| 6,049,551 A | 4/2000 | Hinderks et al. | 370/468 |
| 6,052,384 A | 4/2000 | Huang et al. | 370/468 |
| 6,058,109 A | 5/2000 | Lechleider | |
| 6,078,958 A | 6/2000 | Echeita et al. | |
| 6,151,636 A | 11/2000 | Schuster et al. | |
| 6,163,316 A | 12/2000 | Killan | |
| 6,205,473 B1 | 3/2001 | Thomasson et al. | |
| 6,247,059 B1 | 6/2001 | Johnson et al. | |
| 6,289,464 B1 | 9/2001 | Wecker et al. | |
| 6,321,250 B1 | 11/2001 | Knape et al. | |
| 6,339,595 B1 | 1/2002 | Rekhter et al. | |
| 6,351,471 B1 | 2/2002 | Robinett et al. | |
| 6,389,471 B1 | 5/2002 | Agraharam et al. | |
| 6,401,117 B1 | 6/2002 | Narad | |
| 6,434,621 B1 | 8/2002 | Pezzillo | |
| 6,512,768 B1 | 1/2003 | Thomas | |
| 6,516,352 B1 | 2/2003 | Booth | |
| 6,518,986 B1 | 2/2003 | Mugura | |
| 6,526,057 B1 | 2/2003 | Lee | |
| 6,546,427 B1 | 4/2003 | Ehrlich et al. | |
| 6,553,002 B1 | 4/2003 | Bremer et al. | |
| 6,556,594 B2 | 4/2003 | Uchide | |
| 6,577,806 B1 | 6/2003 | Hirota | |
| 6,628,610 B1 | 9/2003 | Waclawsky | |
| 6,675,385 B1 | 1/2004 | Wang | |
| 6,681,395 B1 | 1/2004 | Nishi | |
| 6,738,639 B1 | 5/2004 | Gosselin | |
| 6,813,214 B2 | 11/2004 | Cho et al. | |
| 6,826,197 B1 | 11/2004 | Goode et al. | |
| 6,877,043 B2 | 4/2005 | Mallory | |
| 6,882,634 B2 | 4/2005 | Bagchi | |
| 6,883,000 B1 | 4/2005 | Gropper | |
| 2002/0024928 A1 | 2/2002 | Furuichi | |
| 2003/0071840 A1* | 4/2003 | Huang et al. | 345/736 |
| 2003/0112746 A1 | 6/2003 | Schaller et al. | |
| 2003/0131007 A1* | 7/2003 | Schirmer et al. | 707/100 |
| 2003/0137541 A1* | 7/2003 | Massengale et al. | 345/764 |
| 2004/0066411 A1* | 4/2004 | Fung et al. | 345/781 |
| 2004/0107198 A1 | 6/2004 | Ronstrom | |
| 2005/0065845 A1 | 3/2005 | DeAngelis | |

OTHER PUBLICATIONS

"PGM Reliable Transport Protocol Specification" Dino Farinacci et al., IETF Standard-Working-Draft, Internet Engineering Task Force, IETF, CH, No. 6, Feb. 13, 2001, XP015035619 ISSN: 0000-0004.

"RTP Retransmission Payload Format" A. Miyazaki et al., IETF Standard-Working-Draft, Internet Engineering Task Force, IETF, CH, vol. avt, No. 2, Jul. 18 2001, XP015015918 ISSN: 0000-0004.

"Extended RTP Profile for RTCP-based Feedback" Jorg Ott et al., IETF Standard-Working-Draft, Internet Engineering Task Force, IETF, CH, vol. avt Jul. 13, 2001, XP015015705 ISSN: 0000-004.

"Reliable Multicast Transport Building Blocks for One-to-Many Bulk-Data Transfer" B. Whetten et al., IETF Standard, Internet Engineering Task Force, IETF, CH, Jan. 2001, XP015008831 ISSN: 0000-0003.

Haskell, Barry G., et al. "Digital Video: An Introduction to MPEG-2," Chapters 2, 3 and 7, pp. 14-31, 32-54 and 146-155, 1997.

Information Technology—Generic Coding of Moving Pictures and Associated Audio: Systems ISO/IEC 13818-1, Dec. 1, 2000.

Information Technology—Generic Coding of Moving Pictures and Associated Audio: Video ISO/IEC 13818-2, May 15, 1996.

Wasilewski, Anthony J., "MPEG-2 Systems Specification: Blueprint for Network Interoperability," Communications Technology, Feb. 1994.

Legall, Didier, "MPEG: A Video Compression Standard for Multimedia Applications," Communication of the ACM, Apr. 1991, vol. 34, No. 4.

* cited by examiner

FIG. 17

Program Inspector — 715

| | | |
|---|---|---|
| Name | Music | 715-1 |
| Description | This is a new program | 715-2 |
| Status | Available | 715-3 |
| Active Jobs | 0 | 715-4 |
| Program Size (bytes) | 0 | 715-5 |
| File Count | 0 | 715-6 |
| Type | Standard File | 715-7 |
| Announce | Private | 715-8 |
| Target Folder | /Music | 715-9 |
| Transaction Log | ☐ | 715-10 |
| Expiry | 7.000000  Days | 715-12 |
| Launch Command | | 715-13 |
| Primary Image | | 715-14 |
| Secondary Image | | 715-15 |

FIG. 18

Job Inspector

| | | |
|---|---|---|
| Job Name | Send Broadcast Guide Updates | 714-1 |
| Program Name | Broadcast Guide Updates | |
| Status | Waiting | 714-2 |
| Job Next Time | Wed Oct 18 2000  15:29:26 | 714-3 |
| Job Stop | Never | 714-4 |
| BandWidth | 100 | |
| Priority | Normal | 714-5 |
| Recurring Job | Recurring | 714-6 |
| Interval | 5.990400 | 714-7 |
| Schedule Interval | Minutes | 714-8 |
| Repeat Name | Every 6 Minutes | 714-9 |
| Daily Start Time | 00:00:00 | |
| Daily Stop Time | 23:59:59 | |
| Log | ☐ | 714-10 |
| Confirmation of Delivery | ☐ | 714-11 |

METHOD AND SYSTEM FOR SCHEDULED STREAMING OF BEST EFFORT DATA

RELATED APPLICATIONS

This application is a divisional of U.S. application Ser. No. 10/147,010, filed May 15, 2002, which is a continuation of U.S. application Ser. No. 09/950,927, filed Sep. 12, 2001 now abandoned.

(1) U.S. patent application Ser. No. 09/007,212, entitled "Receipt and Dispatch Timing of Transport Packets in a Video Program Bearing Stream Remultiplexer," filed on Jan. 14, 1998 for Regis Gratacap and William Slattery;

(2) U.S. patent application Ser. No. 09/007,334, entitled "Dynamic Video Program Bearing Stream Remultiplexer," filed on Jan. 14, 1998 for Regis Gratacap;

3) U.S. patent application Ser. No. 09/007,203, entitled "Re-timing of Video Program Bearing Streams Transmitted by an Asynchronous Communication Link," filed Jan. 14, 1998 for Regis Gratacap;

(4) U.S. patent application Ser. No. 09/007,211, entitled "Bandwidth Optimization of Video Program Bearing Transport Streams," filed on Jan. 14, 1998 for Robert Robinett and Regis Gratacap;

(5) U.S. patent application Ser. No. 09/007,210, entitled "Network Distributed Remultiplexer for Video Program Bearing Transport Streams," filed on Jan. 14, 1998 for Robert Robinett, Regis Gratacap and William Slattery;

(6) U.S. patent application Ser. No. 09/007,204, entitled "Remultiplexer for Video Program Bearing Transport Streams with Assisted Output Timing for Asynchronous Communication Output," filed on Jan. 14, 1998 for Regis Gratacap;

(7) U.S. patent application Ser. No. 09/006,964, entitled "Remultiplexer for Video Program Bearing Transport Streams with Program Clock Reference Time Stamp Adjustment," filed on Jan. 14, 1998 for William Slattery and Regis Gratacap;

(8) U.S. patent application Ser. No. 09/007,198, entitled "Remultiplexer Cache Architecture and Memory Organization for Storing Video Program Bearing Transport Packets and Descriptors," filed on Jan. 14, 1998 for William Slattery and Regis Gratacap;

(9) U.S. patent application Ser. No. 09/007,199, entitled "Scrambling and Descrambling Control Word Control in a Remultiplexer for Video Bearing Transport Streams," filed on Jan. 14, 1998 for William Slattery and Regis Gratacap;

(10) U.S. patent application Ser. No. 09/006,963, entitled "Reference Time Clock Locking in a Remultiplexer for Video Program Bearing Transport Streams," filed on Jan. 14, 1998 for William Slattery;

(11) U.S. patent application Ser. No. 09/393,227, entitled "Remultiplexer Architecture for Controlling the Supply of Data to be Combined With Constant End-to-End Delay Information," filed on Sep. 9, 1999 for John R. Mick, Jr.

(12) U.S. patent application Ser. No. 09/933,265, entitled "Controlling Multiple Nodes To Execute Messages Only Once," filed on Aug. 20, 2001 for Mahshid Ellie Abdollahi, Javad Esmaeili, and Sanjay Bhatia;

(13) U.S. patent application Ser. No. 09/933,260, entitled "Controlling Multiple Nodes Divided Into Groups," filed on Aug. 20, 2001 for Mahshid Ellie Abdollahi, Javad Esmaeili, and Sanjay Bhatia; and

(14) U.S. patent application Ser. No. 09/933,264, entitled "Controlling Multiple Nodes Using SNMP," filed on Aug. 20, 2001 for Mahshid Ellie Abdollahi, Javad Esmaeili, and Sanjay Bhatia.

The contents of these documents are fully incorporated herein by reference.

FIELD OF THE INVENTION

The present invention pertains to scheduling the transmission of files of best-effort data for communication from a source to one or more destination or recipient nodes. In an illustration of the invention, the best-effort data is carried along with digital audio-video signals in a broadcast network. However, the invention can apply in other types of networks.

BACKGROUND OF THE INVENTION

Many networks are known which deliver "best-effort" data, i.e., data delivered with the best efforts of the system at any given instant of time. Such best-effort data need not be strictly delivered piece-wise at any given rate, but rather can be delivered at an arbitrary or variably fluctuating rate. Generally speaking, the efforts by which best-effort data are delivered across the network do not affect the usefulness or utility of the information.

Often, it is desirable to schedule the communication of best-effort data which is available or which can be retrieved and readily made available.

Several communication networks are known which can deliver video or audio signals (hereinafter, "audio-video signals"), such as a terrestrial broadcast network, a cable network and a satellite network. Each of these networks can also deliver digital audio-video signals. In addition, it is also possible to deliver digital audio-video signals via a telephone network, e.g., using T1 (or higher capacity lines) and so-called DSL or digital subscriber loop lines.

In each of the networks described above, the audio-video signals are intended to be delivered in real-time, i.e., for real-time consumption. Specifically, the digital audio-video signals are delivered nominally at a rate that matches the consumption (decode and presentation) rate of the signal. Thus, if the audio-video signal is to be displayed at 30 frames of video per second, the digital information representing the video is nominally delivered at the rate of 30 frames per second. However, in the case that the audio-video signal, or a component elementary stream thereof, such as a video signal, audio signal, closed-caption text signal, etc., is variably compressed, the actual instantaneous bit rate actually fluctuates. Thus, some temporary buffering is required at the receiver/decoder end of the audio-video signal. Such buffer space is of a limited, predetermined size and the flow of digital information through the buffer (more concretely, the time at which each piece of digital information is inputted to or removed from the buffer) is strictly controlled. Therefore, these signals can be considered to be consumed nominally (more or less) at the same rate at which they are delivered.

As noted above, digital audio-video signal data delivered by one of the above noted networks is variably compressed. For example, video can be compressed according to any of the following standards: MPEG-1, MPEG-2, MPEG-4, H.261, H.263, H.320, JPEG, etc. Likewise, audio can be compressed according to any one of the following standards: "MP3" (MPEG-1 Layer III), MPEG-2, AC-3, AC-4, G.720, ATRAC, "MLP" (Meridian Lossless Packing), Delta-Sigma, etc. If the audio-video signal is variably compressed, the amount of information needed to represent a "presentation unit" or a given unit of playback time (e.g., a frame or field of video, an audio frame, etc.) varies from presentation unit to presentation unit. Variably compressed signals have timing and scheduling constraints described in the above-noted incorporated applications. Suffice it to say that in a multiplexed signal of one or more audio-video signals, each elementary stream has a strict piece-wise time delivery schedule that must be observed to enable proper real-time consumption of a given audio-video signal. Also, care must be taken to ensure that the relative spacing of time stamps of a given audio-video signal within a stream is not disturbed too much and that the values of such time stamps are adjusted to reflect any relative movement.

Some of the above networks can also deliver best-effort data as well as real-time data. Herein, best-effort data includes virtually any kind of data which can be delivered independently of the above noted restrictions. Such data can be a file containing, forexample, executable code, an e-mail message, music, video mail, an "EPG" (electronic program guide), a web page, etc. Generally, each data stream of the type noted above is not consumed in real-time, i.e., more or less as delivered, or if executed in real-time, is tolerant of pauses in delivery or presentation of the data stream.

International Patent Application No. PCT/IB00/00605 teaches a system, employed in Assignee's zBand™ product. In this system, a "scheduler" at the head-end of the broadband communication network schedules the transmission of individual best-effort streams and retrieves them for insertion into the audio-video signal according to the schedule. The best-effort data streams are received and stored at a client device or node, which also employs part of Assignee's zBand™ product. The client node can use the best-effort data stored thereat. For example, if the data is a new "core image" or executable code for operating the client node, the client node executes the code. If the data is a video file, the video file is made available for playback by an operator of the client node.

It is desirable to improve this system. For example, it is desirable to provide multiple cooperating, self-configuring sources of the file data. It is also desirable to enable reliable best-effort data transfer. It is also desirable to improve the features of the client nodes to facilitate best-effort data reception.

SUMMARY OF THE INVENTION

These and other objects are achieved according to the present invention. An illustrative environment of use of the invention is a communication network including plural control nodes which communicate information to one or more recipient client nodes.

According to one embodiment, one of the control nodes is chosen to be a primary control node and each other control node is chosen to be an assistant control node. A connection is established between the primary control node and each assistant control node. A job is scheduled for execution at a scheduled time. Each job specifies one or more specific programs to be transmitted on a specific channel at a specific time. A program comprises a group of one or more files, that can be used by a recipient (client) node in a similar fashion, and program information specifying a manner by which a recipient (client) node can use the files. The channel is a distinct path for communicating a program and has channel information specifying a manner of communicating the program. A program can be communicated one of plural different ways as specified by different channel informations. If a job is to be executed by one of the assistant control nodes, the primary control node issues one or more messages to the one assistant control node for causing the assistant control node to execute the job. A designated control node executes the job by, at the scheduled time of the job, communicating at least one program of the job, via the particular channel of the job, to one or more recipient nodes.

An operator console may be provided with a graphical user interface, e.g., for scheduling jobs, defining programs and other tasks. According to one embodiment, the graphical user interface includes a display screen having a first displayable area depicting a time line and a second displayable area, adjacent to the first displayable area, depicting plural tabbed panes. Each tabbed pane corresponds to a channel and has a portion which is always visible and selectable to cause the remainder of the respective tabbed pane to become visible. When a tabbed pane becomes visible, it occludes other portions of other tabbed panes. Each tabbed pane, when selected, depicts time intervals of a certain scale. The visible tabbed pane depicts one or more jobs scheduled for execution as solid lines extending over one or more of the time intervals of the respective pane to represent a time during which the job executes.

Illustratively, the graphical user interface may also have third and fourth display areas. The third displayable area depicts a hierarchical list of selectable channels. The fourth displayable area depicts properties of a selected channel, including channel information dictating the respective manner of communicating data on the corresponding channel. In response to manual input, each channel listed in the third area is individually selectable. The fourth displayable area displays the properties of whichever one of the channels listed in the third displayable area is currently selected.

According to another embodiment, a client node capable of using received program information has a memory, communication interface and processor. The communication interface is for receiving programs, where each program comprises a group of one or more files received at the client node via one of the channels. The channels enable the client node to separately store the program information received from each channel in the memory as a separately accessible object. The processor is for executing plural processes, including a broker process and a session manager process. The session manager retrieves from one of the objects corresponding to a particular one of the channels, designated a service channel, information announcing the existence of other channels and a schedule of programs to be received on each of the channels. The session manager issues notifications of each channel to which the client is subscribed. Responsive to the notifications from the session manager, the broker demultiplexes one or more (of the announced) programs from each channel to which the client is subscribed. The broker uses each individual file contained in each demultiplexed program as specified by program information carried in the program with the respective file.

For example, the broker process may store each received program file in a directory specified by the program information of the respective program.

Illustratively, the session manager also maintains a subscribed program object indicating each program to which the client is subscribed. The broker process accesses the subscribed program object to determine whether or not to demultiplex a given program from one of the channels to which the client is subscribed.

Illustratively, the client node also includes a display, and a manual input device. The announcement information indicates each channel to which the client node can subscribe, and a schedule of each program to be transmitted on each of the channels. The processor further executes a guide server process which displays the announcement information to an operator of the client node. The guide server also receives instructions from the operator via the manual input device for subscribing to, and unsubcribing from, specific ones of the channels and specific ones of the programs which can be received from the channels.

Program file data may be carried in packets of a certain format. According to one embodiment, the program file data is carried sequence of one or more packets where each packet of the sequence is transferred in a signal from a source node (such as a controller node) to recipient node (such as a client node) in whole or as plural segments. A header of a first packet of the sequence of packets includes a program identifier field containing a program identifier which uniquely identifies the program of the sequence of packets. The sequence of packets includes a payload containing one or more data triplets, each data triplet including a tag, a length and a value field. The tag in the tag field uniquely identifies the value in the value field and the length in the length field indicates the offset in data words to an immediately following data triplet. A length of zero indicates that no data triplet follows this data triplet. The value fields of the sequence of data triplets contain information for uniquely correlating file data in each packet of the sequence to a respective file of one of the best-effort programs.

Illustratively, the value of a triplet can indicate one of: (a) the file number of the program corresponding to the file data, (b) the total amount of information in the file, (c) the offset within the file represented by the file data carried in the packet containing this triplet, (d) the last write time of the file, (e) the total number of files expected to be transferred for this program, (f) the file name of the file, or (g) an identifier of the job for this file.

Network elements may also be provided on a return path between the control nodes and the recipient client nodes for assisting in reliable packet communication. According to an embodiment, a client node prepares to receive original data of one or more files of a program from a particular channel. The client node determines that plural ranges of data words of the original data were not received. The client node generates a single packet indicating that the plural ranges of data words were not received. The client node then transmits the single packet on a return path to another node capable of causing the plural ranges of data words to be retransmitted.

According to another embodiment, a network element receives an ANAK packet negatively acknowledging receipt of one or more ranges of data words of one or more of the files of the program. The network element stores information pertinent to the received packet and starts a timer for the ANAK packet. If, before expiration of the timer, another ANAK packet is received which negatively acknowledges receipt of one or more ranges of data words that intersect the ranges of data words of a previously received ANAK packet, the network element consolidates the ranges of the ANAK packets, and selectively resets the timer. If the timer expires, the network element causes the retransmission of all ranges of original data in the consolidated ranges.

According to another embodiment, a control node transmits a plurality of packets containing original data of a file to one or more client nodes on a forward path from the control node to the client nodes. The control node receives one or more negative acknowledgement packets indicating that one or more ranges of data words were not received by at least one client node. The control node multicast retransmits each of the plurality of packets containing the original data in each range indicated by the one or more packets.

According to another embodiment, four types of packets are provided for assiting in reliable transmission. Each packet includes: a source port field, a destination port field, and a type field. An ANAK value in the type field indicates that the packet is an asynchronous negative acknowledgement list packet indicating failure to receiving a list of ranges of original data in other packets. An ANCF value in the type field indicates that the packet is an asynchronous negative acknowledgement list confirmation packet confirming receipt of a packet including an ANAK value in the type field. An ACK value in the type field indicates that the packet is a positive acknowledgement packet acknowledging receipt of original data in other packets. An AACF value in the type field indicates that the packet is a positive acknowledgement confirmation packet confirming receipt of a packet including an ACK value in the type field. The packet also includes a sequence number field containing a value that does not indicate any specific original data packet.

BRIEF DESCRIPTION OF THE DRAWINGS

The following detailed description, given by way of example and not intended to limit the present invention solely thereto will best be understood in conjunction with the accompanying drawings:

FIG. 17 shows a program inspector pane that can be displayed on the graphical user interface of the operator console 330.

FIG. 18 shows a job inspector pane.

DETAILED DESCRIPTION OF THE INVENTION

Network Architecture

Figure 1:
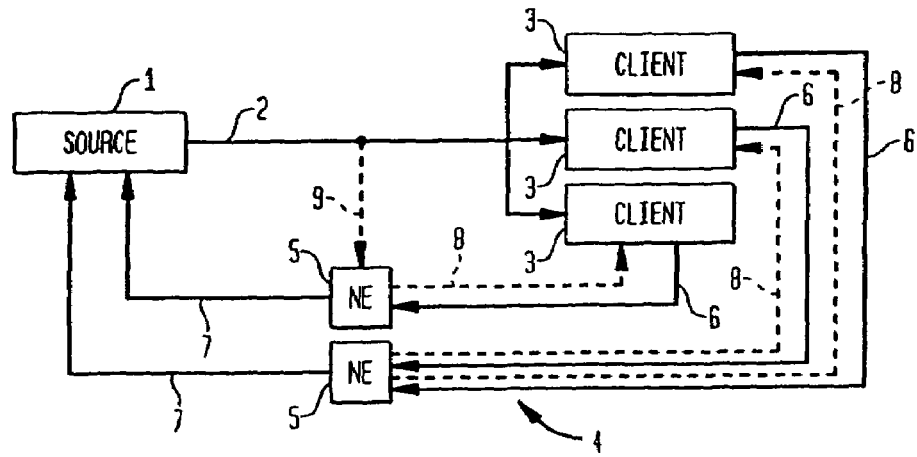
FIG. 1 shows a general network architecture according to one embodiment of the present invention.

As shown in FIG. 1, best-effort data carrying packets are transferred via a forward path 2 from one or more source nodes of best-effort data to one or more recipient nodes 3. The recipient nodes may have a return path 4 to the source node which can be different from the forward path 2 or the same. Optional network element nodes 5, to be described in greater detail below, can be present according to one embodiment, which are capable of at least receiving messages from the recipient nodes via path 6 and transmitting messages to the source node(s) via path 7. In one embodiment, the network element nodes 5 can send messages to the recipient nodes directly or via the path 8 to the source node(s) and the forward path 2. In another embodiment, the source node(s) can send messages to the network element nodes 5 via path 9, e.g., for transfer to the recipient nodes 3.

FIG. 1 is a general network architecture. Such a network can actually be implemented using one or more computers (e.g., PC computers or other computers) and a router at the source node(s) 1, a wide area network (WAN) as both the forward 2 and return paths 4 and computers as the recipient nodes 3. The WAN may be part of the Internet. The network elements 5 can also be computers and the paths 6, 7, 8, and 9 can also be implemented by a WAN. Herein nodes implemented as computers have a processor, a memory (a persistent memory, such as a disk drive, and a volatile memory, such as RAM IC's), a monitor, a manual input device (e.g., a keyboard, mouse, keypad, etc.) a communication device (e.g., a telephone modem, a cable modem, a network interface card, a digital television tuner card, etc.) and a bus interconnecting these devices.

In another embodiment, the invention is implemented using a broadcast network suitable for transmitting digital audio-video signals. Such a network may have excess capacity that can be used to transmit best-effort data.

Figure 2:
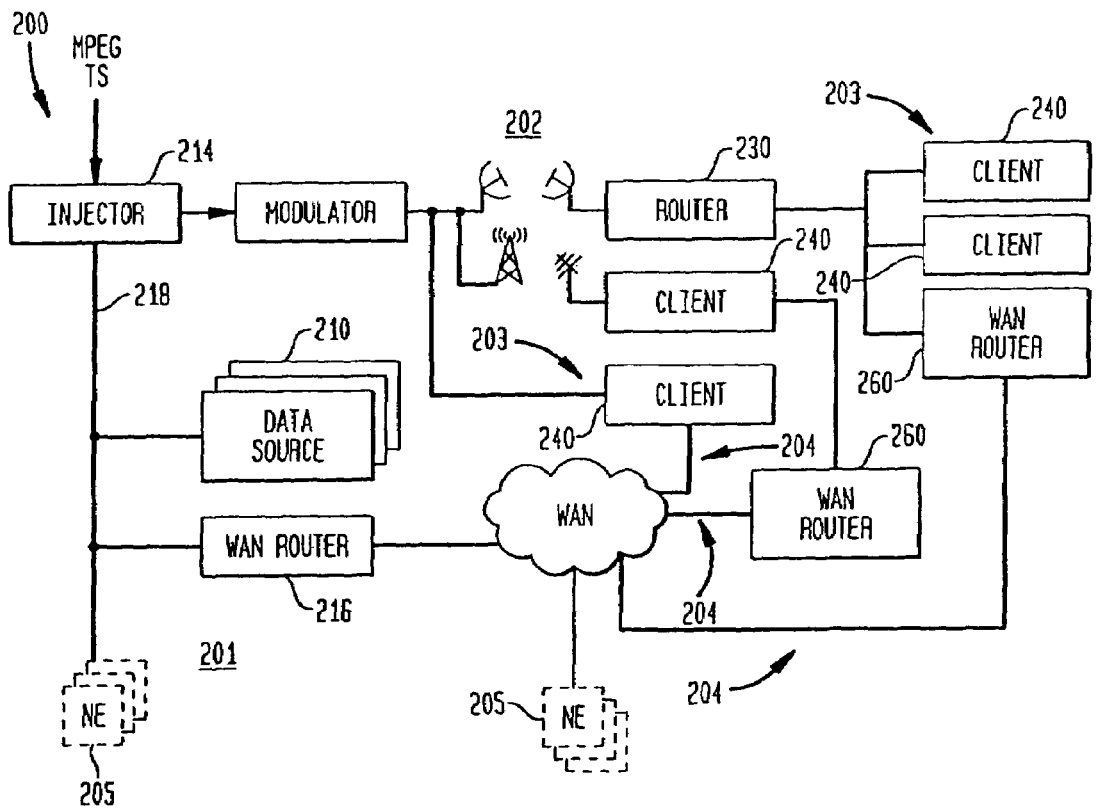
FIG. 2 shows an illustrative broadcast network in which the invention may be used.

FIG. 2 shows an illustrative network 200 in which the invention may be used. The network of FIG. 2 is a cable, terrestrial or satellite broadcast distribution network. In FIG. 2, the broadcast network 200 includes a head end site 201, a forward communication path 202, multiple remote receiver sites 203 and a WAN return path 204. The head end site illustratively includes, best-effort data stream servers 210, a best-effort data stream encapsulator/injector node 214, a WAN router node 216, multiple network element nodes 205 and a local area network (LAN) 218 connecting such nodes 210-216 and 205. The LAN 218 can be one or more high-speed networks such as 100 BASE-T Ethernet networks. The encapsulator/data injector node 214 can include a Source Media Router™ distributed by SkyStream Networks Inc.™, a company located in Sunnyvale, Calif. The best-effort data stream servers 210 can be one or more PC compatible computers running, among other programs, zBand™ Director™ software, which is also distributed by SkyStream Networks Inc.™, adapted as described herein. These best-effort data streams servers 210 will be described in greater detail below.

The WAN router node 216 can be any commercially available router, such as a 7200™ series router, distributed by Cisco Systems, Inc.™, a company located in San Jose, Calif. The WAN can be a publicly accessible WAN, such as the Internet, or a private WAN, such as a virtual private network (VPN) that may include a firewall for security. The return path 204 can also be implemented as a wireless channel, e.g., a satellite channel, a terrestrial channel, etc.

The head-end site 201 also includes a modulator 220 connected to receive a digital signal outputted from the encapsulator/injector node 214. The modulator 220 can be any suitable modulator for producing a signal that carries the inputted digital signal provided by the encapsulator/injector node 214. The modulated signal is then transmitted.

Also shown, in FIG. 2, the encapsulator/injector node 214 receives a transport stream. The transport stream illustratively is a sequence of transport packets formed according to the MPEG-2 standard. Each transport packet is a 188 byte packet containing digital information of a specific single stream. The inputted transport stream illustratively carries the digital data of the elementary streams that make up one or more real-time programs. The encapsulator/injector node 214 is capable of inserting best-effort data into such a transport stream in a fashion that meets the strict timing and scheduling requirements described above.

The forward path 203 can be implemented as any combination of the air, space, coaxial cables, optical fibers, copper wires and suitable electronic equipment for carrying signals on such physical media, as necessary to suit the particular network.

The network element nodes 205 can be located at the head end site 201 or optionally located at one or more other locations. If located at other locations, they are preferably connected to the head end site 201, e.g., via the WAN.

Each receiver site 203 has one or more client nodes 240 which may be implemented using a PC compatible computer running zBand™ Client™ software available from SkyStream Networks, Inc,™ adapted as described below. In some cases, the client site has one or more router nodes 230, 260. For example, if the signal is received via satellite, the router node 230 can be an Edge Media Router™ available from SkyStream Networks Inc.™ In the alternative, the client nodes 240 can have installed therein digital television reception cards, such as the TerraCast DAT-100™ or Satellite Express™ available from BroadLogic™, a company located in Milpitas, Calif., for receiving the modulated signal from the head end site 201 directly. The router 260 can be a WAN router for connecting to the return path 204. This router 260 can be of the same design as router 216. In an alternative embodiment, the receiver sites 203 have a different kind of return path 204, such as a wireless return path.

Communication Over-View in the Network 200

The following describes the basic communication on the network 200. One or more digital audio-video signals are inputted to the encapsulator/data injector 214. Illustratively, the digital audio-video signals are inputted as an MPEG-2 compliant transport stream, which is an interleaved sequence of transport packets bearing the audio-video signals. Each transport packet is a 188 byte packet with a four byte header. The header includes a thirteen bit long packet identifier or PID. Each PID is uniquely assigned to one specific stream, e.g., an elementary stream or component signal of a composite audio-video signal. A transport packet with a given PID only contains the data of that specific stream.

The encapsulator/data injector 214 locates opportunities to insert other transport packets into the inputted sequence of transport packets that satisfies the above-described piecewise timing and scheduling constraints. Such transport packets contain data supplied by other devices, such as the best-effort data streamers 210.

Figure 3:
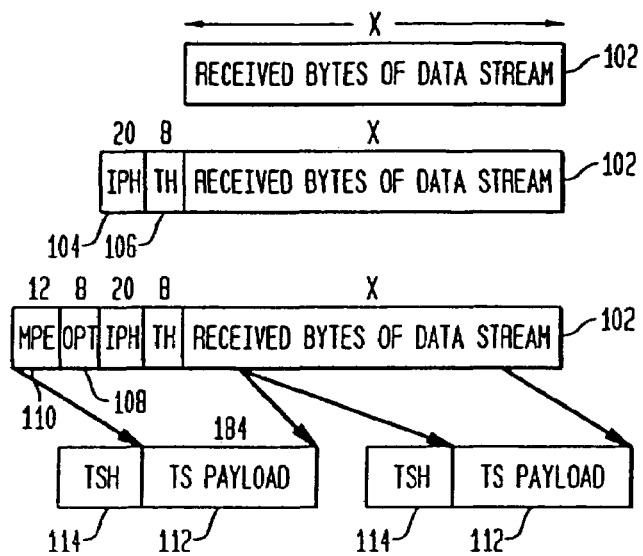
FIG. 3 illustrates the formatting of best-effort data into transport packets according to an embodiment of the present invention.

FIG. 3 illustrates how best-effort data is formatted into transport packets. A unit of X bytes of a given data stream 102 is obtained by one of the best-effort data streamers 210. This unit of information may simply be the stream of bytes of all or part of a packet generated as described below. The best-effort data streamer 210 then appends a transport layer header (TH) 106 and a network layer header (IPH) 104 to the unit of information 102. The transport header 106 can be a UDP or TCP header. In the yet another alternative, employing IP tunneling, the transport header 106 also includes a second embedded network layer (e.g., IP) header in addition to the network layer header 104. An 8 byte UDP transport header 106 is shown. In addition, the network layer header 104 is an IP header. An IP header includes a source address, which is the IP address of the node that transmitted the packet, and a destination address, which is the address assigned to the node or nodes which are to receive the packet. Destination addresses may be unicast addresses assigned to only a single node or multicast address assigned to a multiple nodes that have subscribed to a multicast group.

The packet thus formed, including unit of information 102 and headers 104 and 106, is then transferred via the LAN 218 to the encapsulator/data injector 214 as one or more frames formatted according to the Ethernet physical and link layer protocols. The encapsulator/data injector 214 simply extracts the information carried in these frames as they arrive.

Afterward, the encapsulator/data injector 214 appends a 12 byte MPEG encapsulation (MPE) protocol header 112, and may also append an optional (OPT) 8 byte long field 108 according to the MPE protocol. MPE is a standard for encapsulating data in transport packets promulgated by the Digital Video Broadcast (DVB) standards body in standards document EN 301 192. The encapsulator/data injector 214 segments the unit of information thus formed into 184 byte long transport packet payloads 112. The encapsulator/data injector 214 attaches a transport stream header 114 to each 184 byte payload. The encapsulator/data injector 214 inserts a particular PID into each transport stream header 114 to indicate that the transport packet contains best-effort data. The encapsulator/data injector 214 then transmits the transport packets bearing best-effort data within the outputted transport stream.

The modulator 220 modulates the transport stream onto one or more frequency channels. Illustratively, the modulator 220 can receive separate transport streams (not shown) for each frequency channel on which the modulator 220 can modulate digital information. In the case of a satellite forward path, the modulator 220 can, for example, QPSK modulate a transport stream on a 22 MHz wide frequency channel, located in the range of 950 MHz-2,150 MHz. In the case of a terrestrial forward path 203, the modulator can, for example, 8-VSB or OFDM modulate the signal onto a 6, 7 or 8 MHz frequency channel according to the ATSC or DVB standards, respectively. In the case of a cable forward path, the frequency channels illustratively are 6, 7 or 8 MHz but another modulation technique such as 64-QAM can be used. The modulated signal is then transmitted via the forward path 202 to the remote sites 203.

At the remote sites 203, each router node 230, or each client node 240 directly receiving the modulated signal, is configured to tune to a specified frequency channel. Illustratively, the router nodes 230 each tune to the frequency channel carrying best-effort data. The router nodes 230 or client nodes 240 demodulate the transport stream from the tuned frequency channel. The router nodes 230 or client nodes 240 then filter out only those transport packets having a specific PID, or one of a list of PIDs, for which they have been configured to accept. All other transport packets are discarded or ignored. Illustratively, the router nodes 230 and client nodes 240 are configured to select those transport packets having the same PID(s) assigned to carrying best-effort data. The router nodes 230 or client nodes 240 recover from each payload 112 the portions of the unit containing the headers and fields 110, 108, 104, 106 and 102.

Next, the router nodes 230 or client nodes 240 examine the IP destination address in the network layer header 104. If the IP destination address is suitable for receipt by one of the client nodes 240 attached to the router node 230 via the LAN, or the specific client node 240 receiving the signal directly, then the information is recovered from the packet. If the IP destination address is not otherwise recognized, the router node 230 or client node 240 discards or ignores the unit 102-110. In the case of the router nodes 230, the recovered information is transferred via the LAN for receipt at the appropriate attached client nodes. Each client node 240 possessing the recovered information then processes the information as described below.

Illustratively, each client node 240 executes an operating systems such as Windows™ or Windows NT™, available from Microsoft Corporation™, a company located in Redmond, Wash. or LINUX which provides software for "opening" connections and for receiving data on such connections. In other words, the software provided for the client nodes 240 provides a manner for receiving information destined to particular IP addresses and UDP/IP and TCP/IP ports. For each open connection, data is automatically received if it contains the appropriate addresses and port combination and data for each unique connection is separately buffered and made available for use by other processes executing on the client node.

When necessary, the client nodes 240 can also communicate to a specific network element 205. The client nodes 240 generate packets and either transmit them directly, or via an attached router 260 and the WAN to the appropriate network element 205. For example, if the WAN is the Intenet, then TCP/IP or UDP/IP can be used for the communication. The network elements 205 can use a similar process to communicate directly with the client nodes 240. Likewise, if the network elements 205 are located remotely from the best-effort data sources 210, the network elements can use a similar manner for communicating with the best-effort data sources 210. It is also possible to use wireless channels for each of the above communications.

Control Node Network

Figure 4:
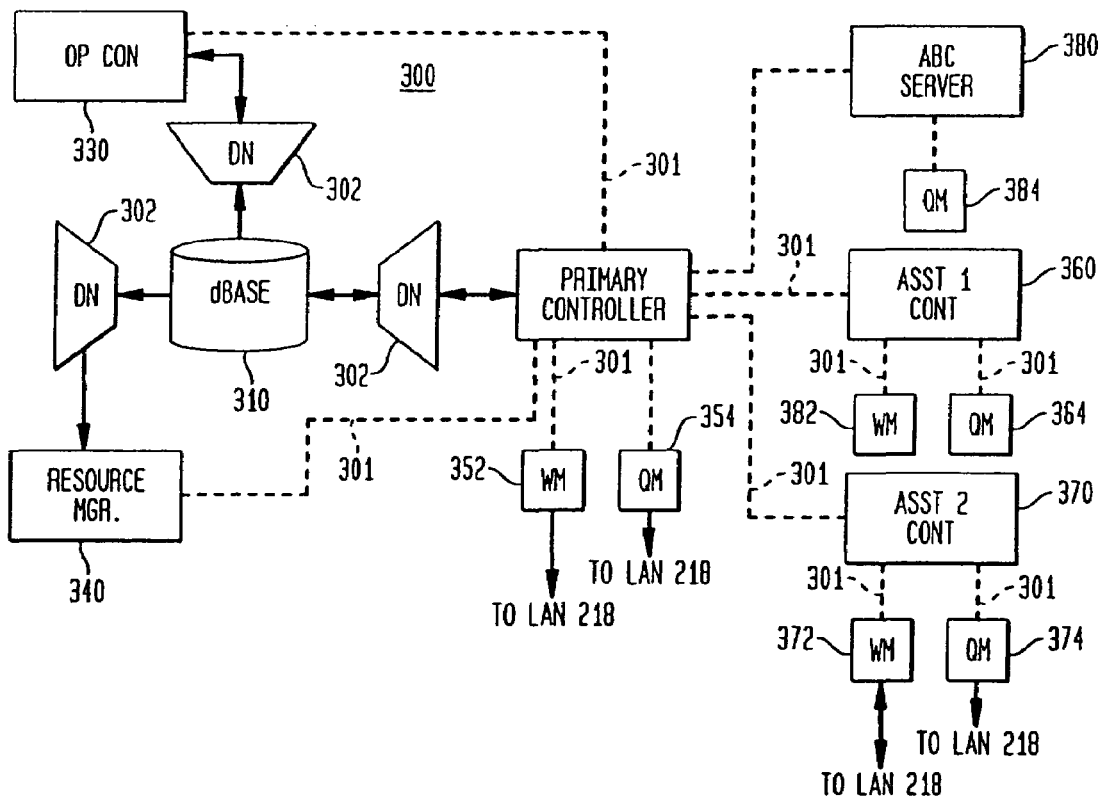
FIG. 4 shows a functional block view of the best-effort data sources 210.
Figure 5:
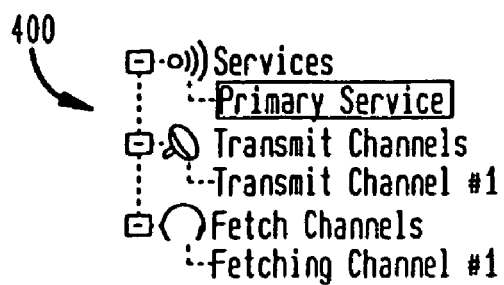
FIGS. 5-8 show different screen shots displayed by the graphical user interface associated with the resource manager 340 in connection with creating a service channel.
Figure 6:
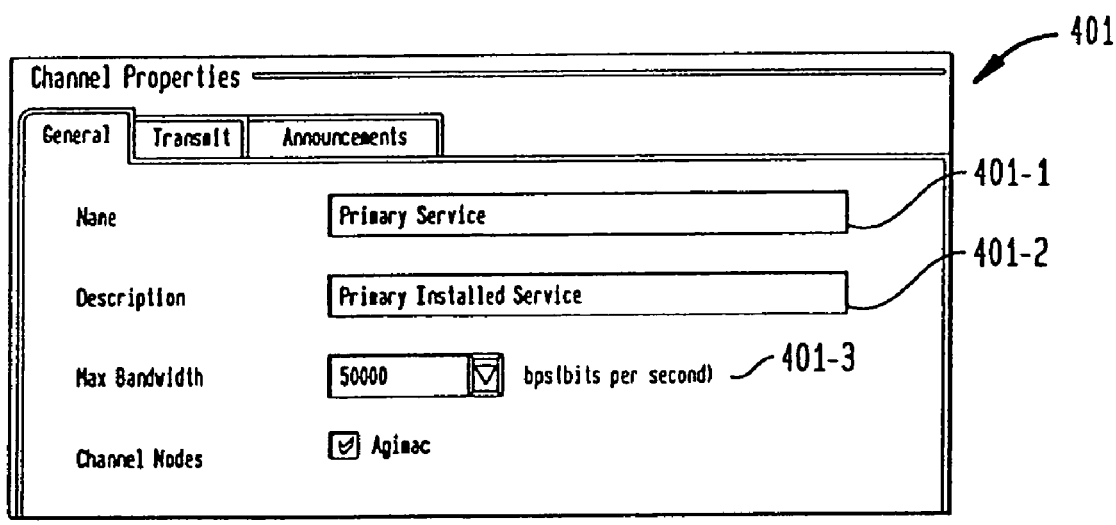
Figure 7:
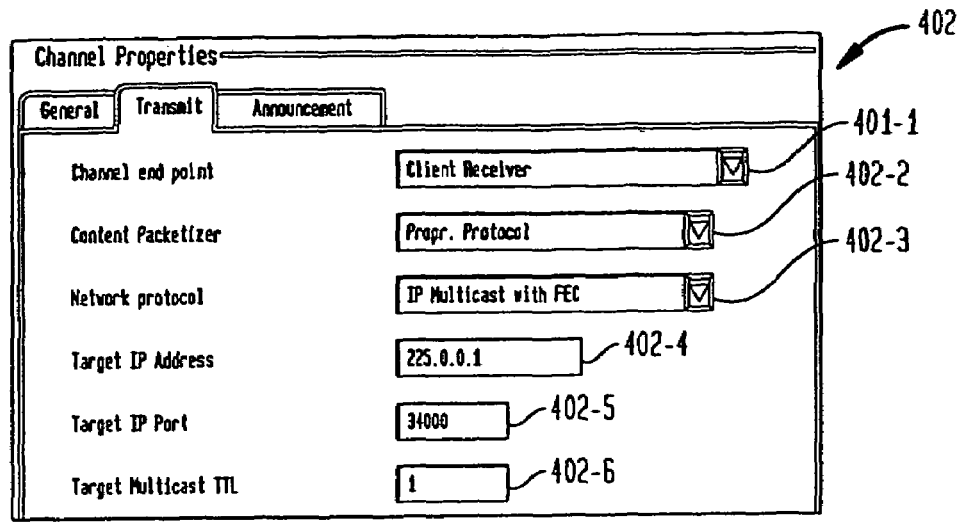
Figure 8:
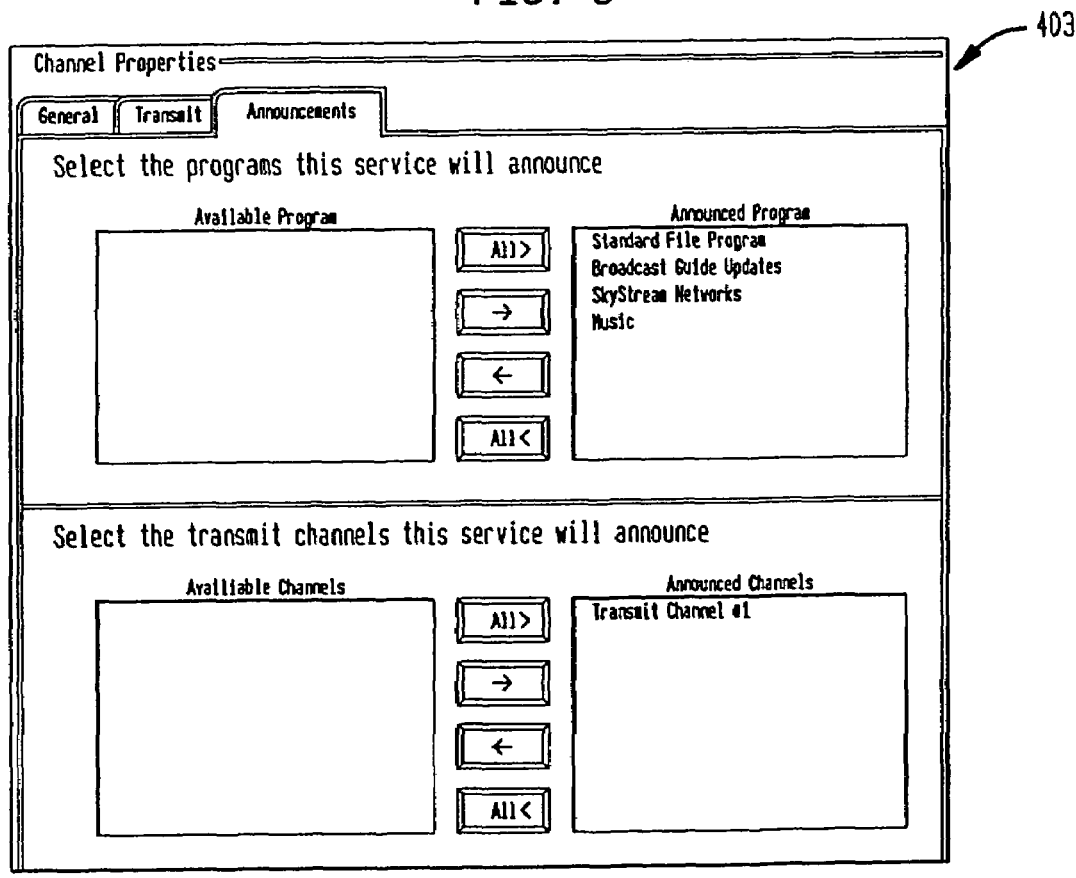

The best-effort data sources can be implemented as a suitably programmed combination of servers, PC compatible computers, disk drives, operator terminals and network equipment. FIG. 4 shows a functional block view of the best-effort data sources 210 which is useful for understanding the functions they perform. As shown, three controllers, namely, a primary controller 350, a first assistant controller 360 and a second assistant controller 370, are connected by a controller network 301. Each controller has two types of modules, namely, a web module 352, 362, 372 and a queue module 354, 364 and 374. Also connected to the controller network 301 are an operator console 330, an ABC server 380 and a resource manager 340. A data network 302 is also provided for connecting the primary controller 350, operator console 330, and resource manager to a database 310.

As will become apparent from the discussions below, the controller network 301 and the data network 302 need not, and in fact often are not, distinct physical networks with different links and physical connections. Rather, they are implemented as separate virtual networks, e.g., over the same physical network of physical links and physical connections. The controller network 301 is for requesting and acknowledging tasks, reporting events and logging events. The data network 302 is for communicating database information amongst the elements which need direct access thereto.

In implementation, each of the elements 350, 352 and 354 are processes executing on a single PC compatible computer. Likewise, each of the elements 360, 362 and 364 are processes executing on a second PC compatible computer and each of the elements 370, 372 and 374 are processes executing on a third PC compatible computer. Collectively, a controller process 350, and it associated web and queue modules 352 and 354 executing on a single PC compatible computer form part of a control node. As each control node is started, the controller process 350, 360 or 370 is started. This control process 350 spawns the web module 352, 362 or 372 and one or more respective queue modules 354, 364 or 374. The control process, e.g., controller 360, opens a communication connection with each process 362 and 364 it spawns, implemented by internal communication.

A started control process, e.g., the control process 350, also searches for other control processes already executing, e.g., by communication on a LAN 218 (FIG. 2) connecting the PC computers on which the control processes execute. If no other control process is detected, the given control process nominates itself the primary controller. For example, assume that the controller 350 is started first. This controller 350 will nominate itself the primary controller as no other controller can be detected.

On the other hand, if the control process, e.g., the control process 360, detects another control process already executing, e.g., the control process 350, the new control process 360 opens a connection with the other control process 350. Such a connection can be opened as a TCP/IP connection using the service provided by the native operating system on the PC computer. A connection is also opened for each spawned module 362 and 364 to the primary control process 350. Furthermore, as each control process is added, it is assigned a next lower ordered priority ranking. Thus, if the controller 350 is started first, the controller 360 is started second, and the controller 370 is started third, they will be ranked in the following order: first-primary controller 350, second-first assistant controller 360 second, third-second assistant controller 370, etc.

Once a connection is opened between the primary controller 350 and an assistant controller 360 or 370, the primary controller 350 will periodically send "heartbeat" messages indicating that the primary controller 350 is functioning. If the next higher ranking controller, e.g., the first assistant controller 360, should fail to receive a heartbeat message from the primary controller 350 within a predefined time interval, the first assistant controller 360 will assume that the primary controller 350 is disabled. The first assistant controller 360 will then assume the role of the primary controller and perform the functions of the primary controller (described below). Thus, the rank order of the controller 350, 360 and 370 defines an ordering of substitution of controllers in the event of failure.

The operator console module 330 is a process executing on a terminal with a monitor and manual input device (e.g., keyboard and pointer device, such as a mouse). For example, the operator console module 330 can execute on the same PC as the primary controller 350. Alternatively, the operator console module 330 executes on a PC compatible computer geographically remote from the data network 302 and primary controller 350. In such a case, the operator console 330 communicates with the data network 302 and primary controller 350 via a WAN. An authentication technique may be employed by the operator console 330 and the elements 302 and 350, using a well-known challenge-response protocol, to prevent unauthorized tampering with the system.

The resource manager module 340 is also implemented as a process executing on a terminal with a monitor and manual input device. For sake of convenience, the resource manager 340 and operator console 330 may be installed on the same PC compatible computer.

The database 310 is implemented using any high capacity storage device, such as a set of one or more disks and appropriate server hardware. Again, the database module 310 can be incorporated into the same PC compatible computer as other elements, e.g., operator console 330, resource manager 340 and/or primary controller 350.

The ABC server 380 is implemented as a process executing on a PC compatible computer. For example, the ABC server 380 may execute on the same or a different computer as the primary controller 350. The ABC server 380 is for ensuring delivery of information to client nodes 240 and is described in greater detail below. The ABC server 380 has its own queue module 384.

The data network 302 which interconnects the database 310, operator console 330, primary: controller 350 and resource manager 340, may be implemented by communicating on the LAN or other network(s) that attaches these devices via connections. Illustratively, all changes to the database 310 are communicated to the other elements 330, 340 and 350 on the data network 302. Thus, if the resource manager 340 enters a change to the database 310 (which change is communicated to the primary controller 350, that writes the change to the database 310), the change is communicated to the processes 330. Thus, the operator console 330 will be notified of the change and be enabled to display or to use of the change to the database 310.

Resource Manager—Defining Channels

The resource manager can be used to set up communication channels. Herein, a channel is a virtual path for communicating best-effort data and specifies a manner by which the best-effort data is communicated. Each channel provides for separable receipt of best-effort data. A convenient manner for implementing channels is with different IP addresses and/or transport layer (TCP or UDP) ports. This is because the operating system of many PC compatible computers support receipt and separation of packet data based on these parameters. Such a communication service can be easily utilized with little or no modification.

Illustratively, the resource manager 340 enables creation of three types of channels, namely, a transmit channel for transferring best-effort data, a fetch channel for retrieving and aggregating best-effort data from another node and a service channel for transmitting announcement messages.

FIGS. 5-8 show different screen shots displayed by the graphical user interface associated with the resource manager 340 in connection with creating a service channel. First, 400 refers to a hierarchical tree showing the service, transmit and fetch channels defined so far. Next, 401, 402 and 403 refer to different displayed views of a window. Specifically, each view shows the displayed window when a different tab is selected by the operator. When the "General" tab is selected, view 401 is displayed in the window. In this view 401, the operator can enter a name or identifier of the service channel 401-1, a description of the service channel 401-2 and the maximum bandwidth 401-3 of the service channel. The operator can also check "Channel Nodes" boxes 401-4 associated with each controller 350, 360 or 370. As shown, only one controller node is activated named "agimac", so only one node can be specified. This latter information indicates which controllers 350, 360 and/or 370 can be assigned to transmitting information on this service channel.

View 402 is displayed in the window when the "transmit" tab is selected. In this view 402, the operator can specify the "Channel end point" 402-1, the content packetizer 402-2, the network protocol 402-3, the target IP address 402-4, the target IP port 402-5 and the target multicast time to live 402-6. The channel endpoint 402-1 specifies which node is to receive the information on the channel. In the view 402, the client nodes 240 are specified. The channel packetizer specifies a protocol for formatting program file data into packets. The packets form the payload of other packets that can be transmitted on the Internet, e.g., TCP/IP, UDP/IP, etc. packets. Illustratively, only a protocol defined herein can be specified. The network protocol 402-4 is the network layer protocol for transmitting the best-effort data, e.g., IP multicast with forward error correction. This specifies the network layer encapsulation for carrying the file data bearing packets formatted as described below. Target IP address 402-4 and Target IP port 402-5 are the IP address and IP ports to be specified in the IP packets created for communicating on this channel. Target multicast time to live 402-6 is for specifying how long to hold a packet before dropping it.

View 403 is for choosing the programs and channels this service channel will announce. As shown, add ">" and delete ">" as well as add all "All>" and delete all "All<" buttons are provided for selecting specific programs and channel to announce. The service channel is a special channel for carrying service announcement messages. Such messages abide by the Service Announcement Protocol ("SAP") and Session Description Protocol ("SDP"). See M. Handley, C. Perkins, E. Whelan, "Session Announcement Protocol," RFC 2974 (October 2000); and M. Handley, V. Jacobson., "SDP: Session Description Protocol," RFC 2327 (April 1998). Other channels, as well as programs carried on such channels, can be announced. Herein, a program is a signal containing a group of one or more files that can be used by a recipient client node 240 is a similar fashion, and program information. The program information, as described below, is meta-data indicating how the group of files can be used in a similar fashion.

Figure 9:
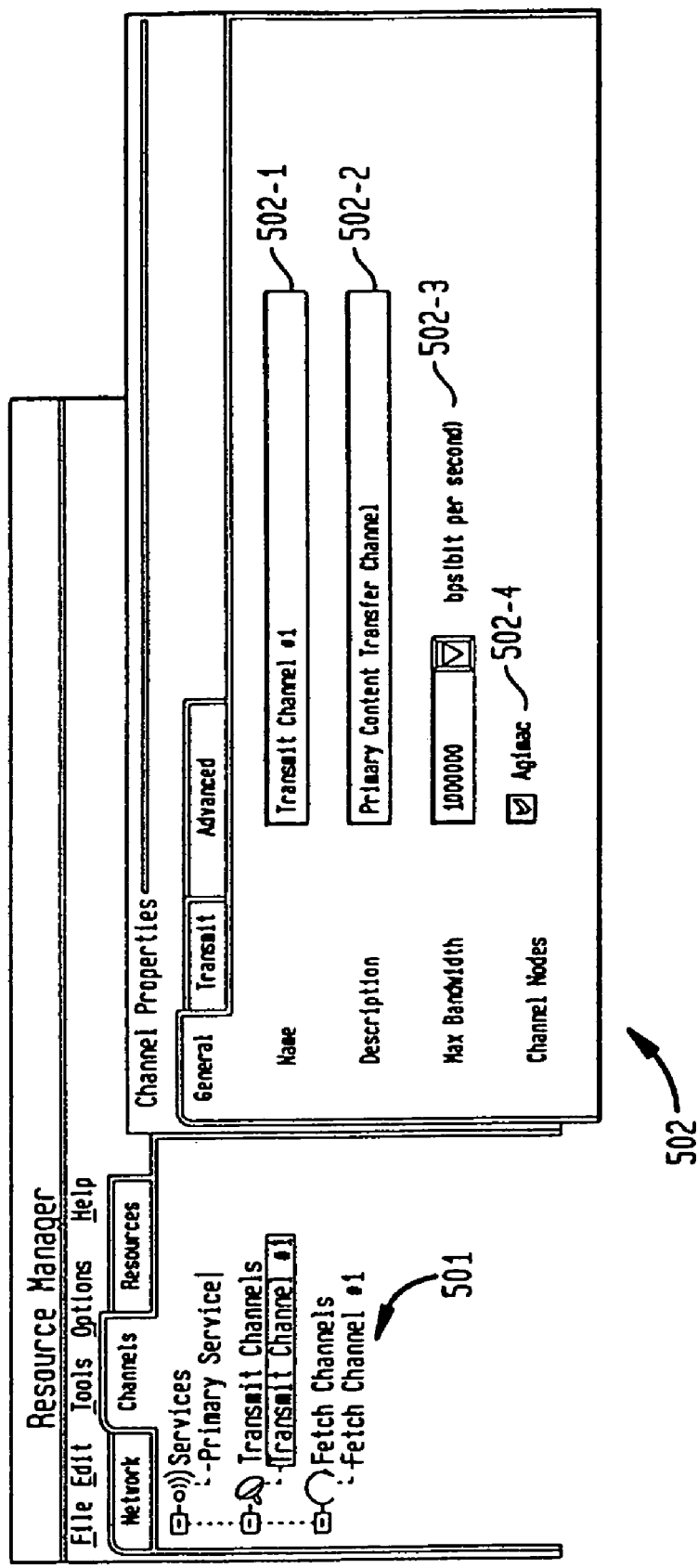
FIGS. 9-11 show a series of screen shots that are depicted on a graphical user interface associated with the resource manager 340 in connection with creating or modifying a transmit channel.
Figure 10:
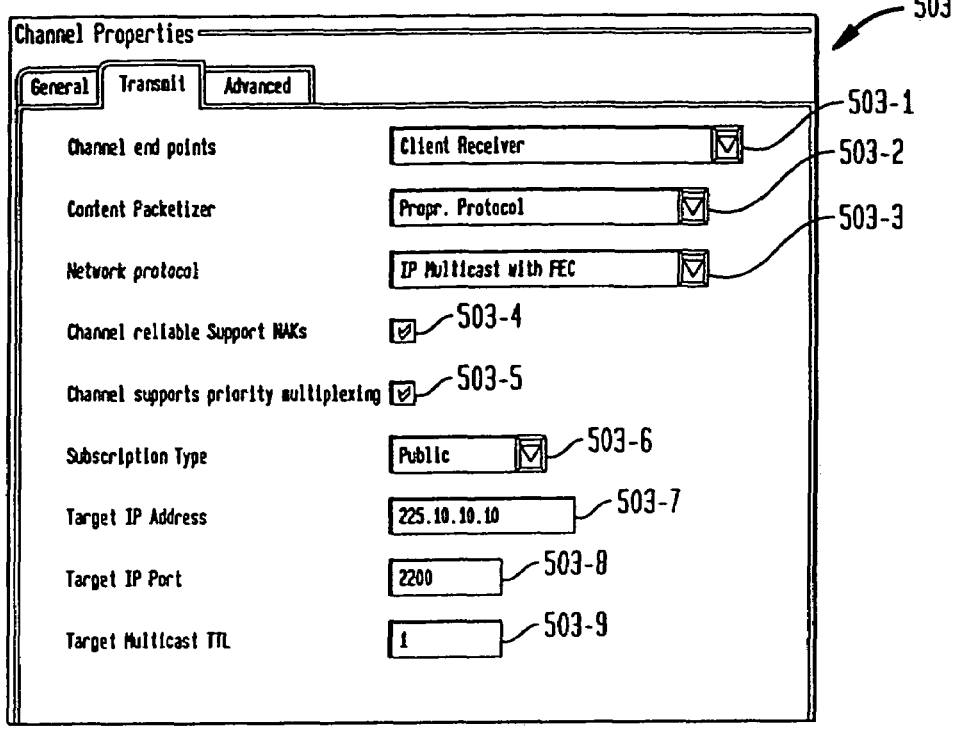
Figure 11:
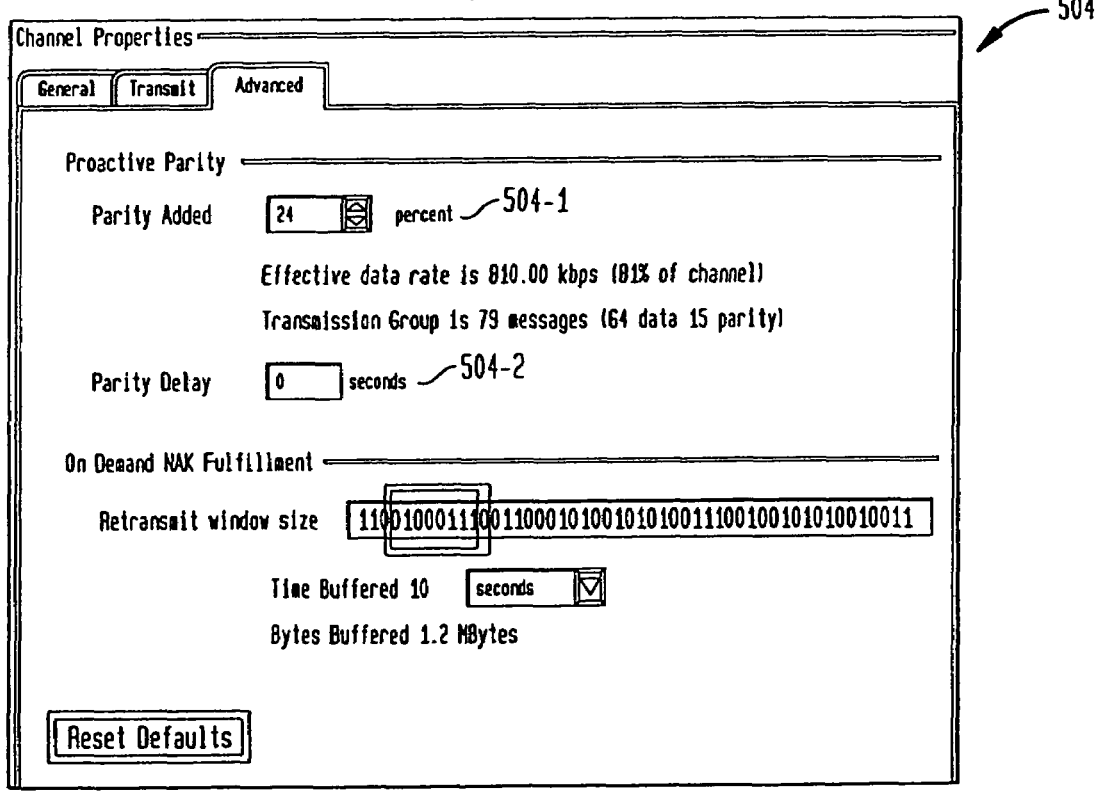

FIGS. 9-11 show a series of views 501, 502, 503 and 504 that are depicted on the graphical user interface associated with the resource manager 340 in connection with creating or modifying a transmit channel. The reference 501 refers generally to the hierarchical tree of channels showing a transmit channel named "Transmit Channel #1" as selected. View 502 shows what is displayed in a window when the tab labeled "General" is selected by the operator. When the "General" tab is selected, the operator can enter the name of the transmit channel 502-1, a description 502-2, the maximum bandwidth 502-3 and can check boxes 5024 for each controller 350, 360 or 370 permitted to transmit data on this transmit channel.

View 503 shows what the window displays when the operator selects the "Transmit" tab. In this view 503, the operator may enter the channel end point 503-1, the content packetizer 503-2, the network protocol 503-3, whether or not the channel is reliable 503-4, whether or not the channel supports multiplexing 503-5, a subscription type 503-6, a target IP address 503-7, a target IP port 503-8 and a target multicast time to live 503-9. Check box 503-4 may be checked to cause the communication to employ the asynchronous back channel (ABC) extension to the PGM protocol described below. Check box 503-5 can be checked to enable the channel to multiplex the data of two or more programs on the same channel. When checked, multiple programs can be specified for contemporaneous communication wherein packets of the specified programs are time division multiplexed on the channel. The subscription types which can be specified in field 503-6 include "Public," "Private," and "Mandatory". A mandatory subscription requires all client nodes 240 to automatically subscribe to this channel to receive the information carried thereon. A Public subscription enables all client nodes 240 to receive announcements indicating the availability of this channel. However, subscription to the channel is not automatic-client nodes 240 must deliberately subscribe to them so as to receive the best-effort data carried therein. A private subscription is announced to all client nodes 240 but only certain targeted client nodes 240 can display the availability of this channel to their operators. Likewise, only the targeted client nodes 240 can subscribe to this channel. The other fields 503-1, 503-2, 503-3, 503-7, 503-8 and 503-9 are similar to like fields described above so their description is not repeated.

View 504 shows what the window displays when the operator selects the "Advanced" tab. In this view, the operator can specify a percentage of the transmitted group that will contain parity information for error correction 504-1, and the delay for sending parity information 504-2. Furthermore, the operator can specify the amount of information to buffer for retransmission in response to messages indicating that one or more clients did not receive the original communication of data on this channel. This is achieved by the operator dragging the slider to the right to increase the amount of parity or to the left to decrease the amount of parity. This in turn increases or decreases respectively, the "Time Buffered" value. The time buffered value indicates how many seconds of transmittable data is buffered, and the amount of buffered data is equal to this time value multiplied by the bandwidth.

Figure 12:
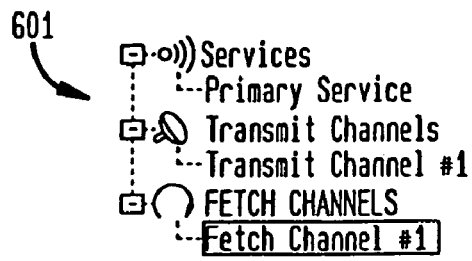
FIGS. 12-14 show screen shots depicted by a graphical user interface associated with the resource manager when creating or modifying a fetch channel.
Figure 13:
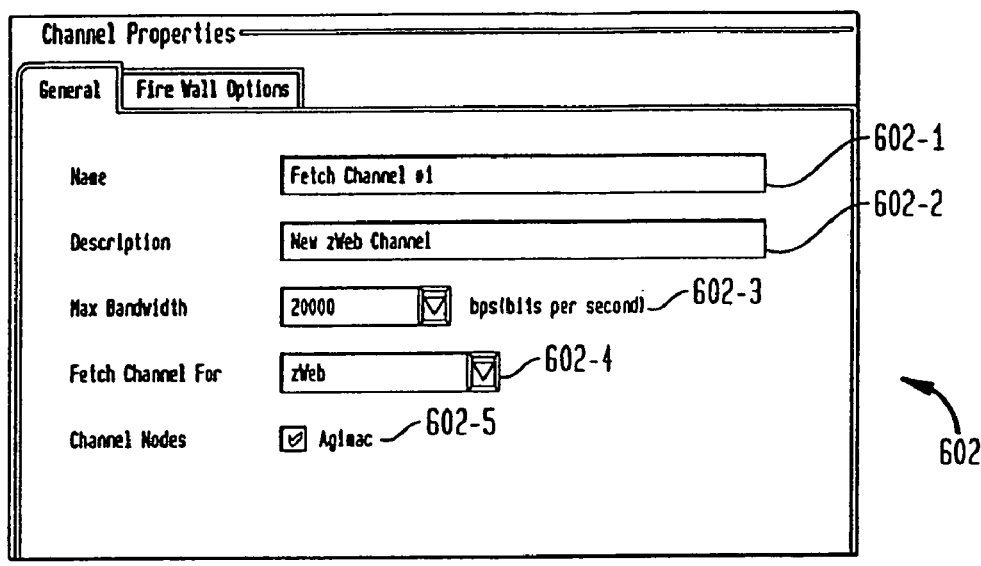
Figure 14:
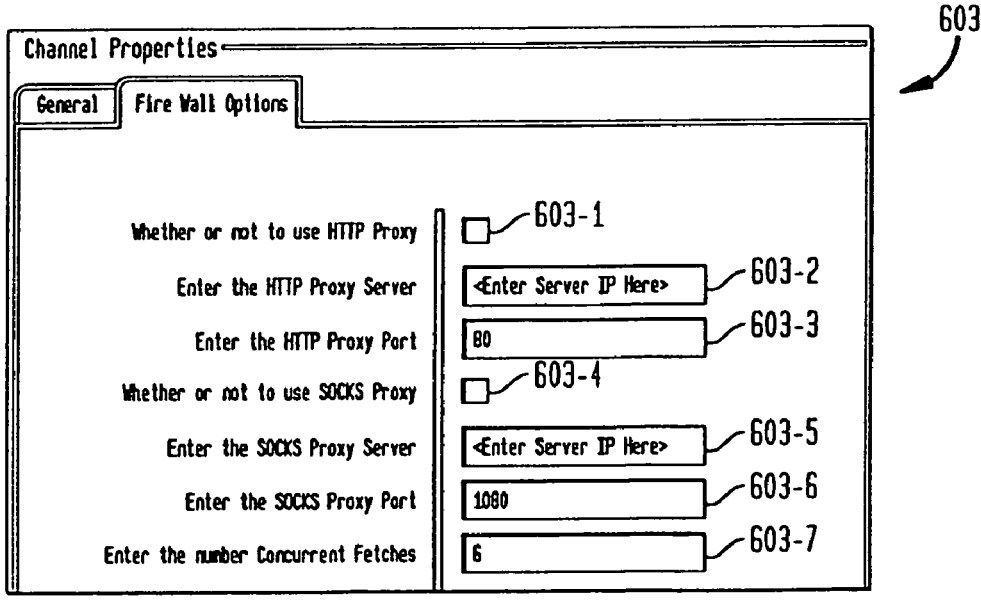

FIGS. 12-14 show views 601-603 depicted by the graphical user interface associated with the resource manager 340 when creating or modifying a fetch channel. View 601 generally refers to the tree hierarchy of channels when a fetch channel named "Fetch Channel #1" is selected by the operator. When this channel is selected, or when the operator chooses to make a new fetch channel, a window, shown in views 602 or 603, is displayed. View 602 shows what is displayed in the window when the tab labeled "General" is selected by the operator. In this view, the operator can select or modify the name 602-1, description 602-2, maximum bandwidth 602-3 and module that supports this channel 602-4. The field 603-4 is for picking a specific type of module, i.e., the web module 352, 362 or 372 which communicates using this channel. Illustratively, only the web module 352, 362 or 372 supports this type of channel. The operator can also check boxes 602-5 of the controllers 350, 360 or 370 that can communicate on this fetch channel.

View 603 shows what is displayed in the window when the tab "Fire Wall Options" is selected by the operator. The operator can check various boxes 603-1 and 603-4 and fill information for fields 603-2 and 603-3 (when check box 603-1 is checked), fields 603-5 and 603-6 (when check box 603-4 is checked) and field 603-7 which pertain to use of a fire wall. These options pertain to other well-known protocols and are not described in any greater detail herein.

When the resource manager 340 creates a channel, the resource manager 340 notifies the primary controller 350 via the control network 301. The primary controller 350 assigns a unique 32-bit channel identifier to the channel and stores information associated with the created channel in the database 310 via the data network. Message are communicated from the database 310 to the operator console 330, the resource manager 340 and the primary controller 350 connected to it indicating the availability of this new channel.

Operator Console—Defining Programs and Scheduling Jobs

Figure 15:
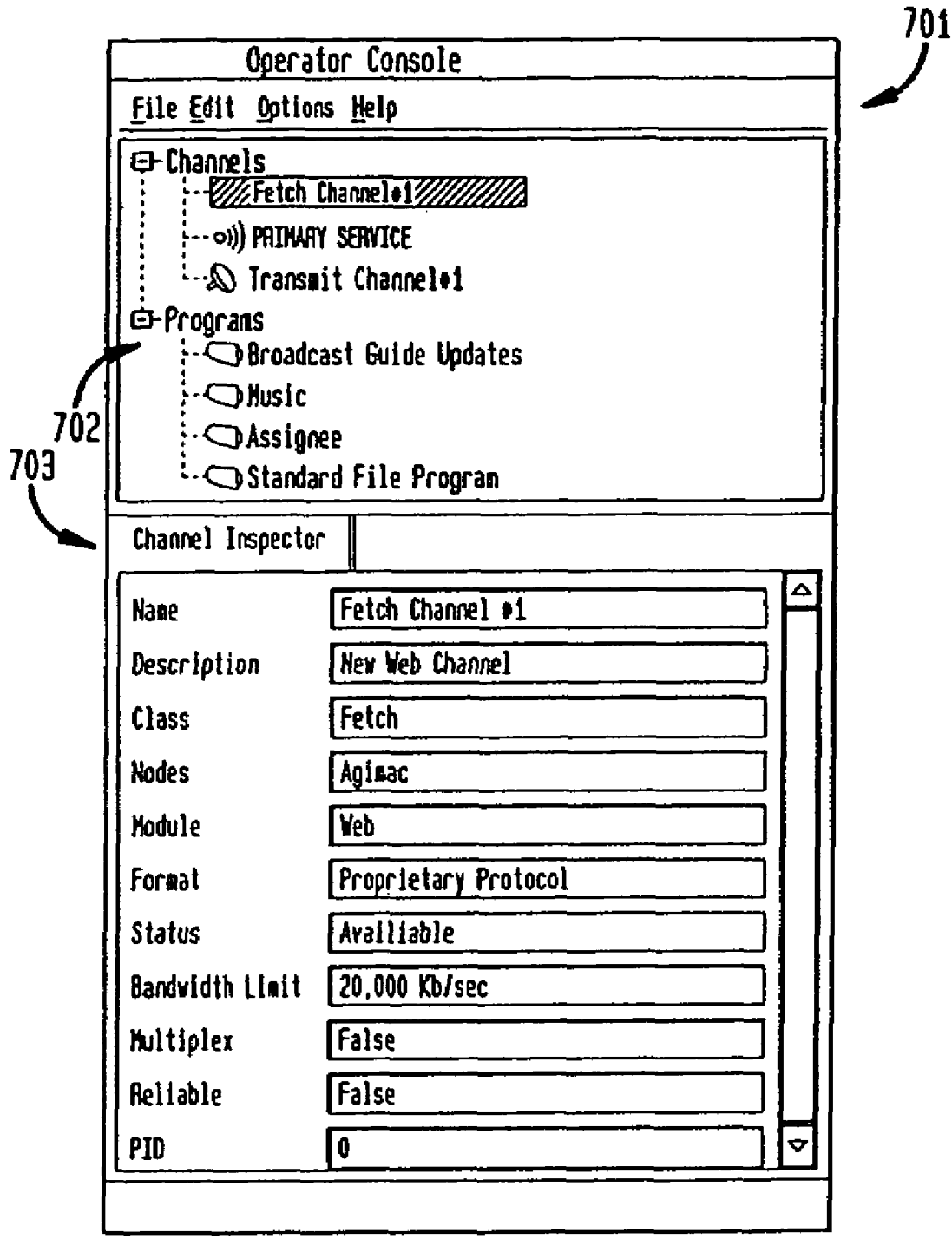
FIGS. 15-16 show the left and right hand sides, respectively of a window that can be displayed using the GUI of the operator console 330.
Figure 16:
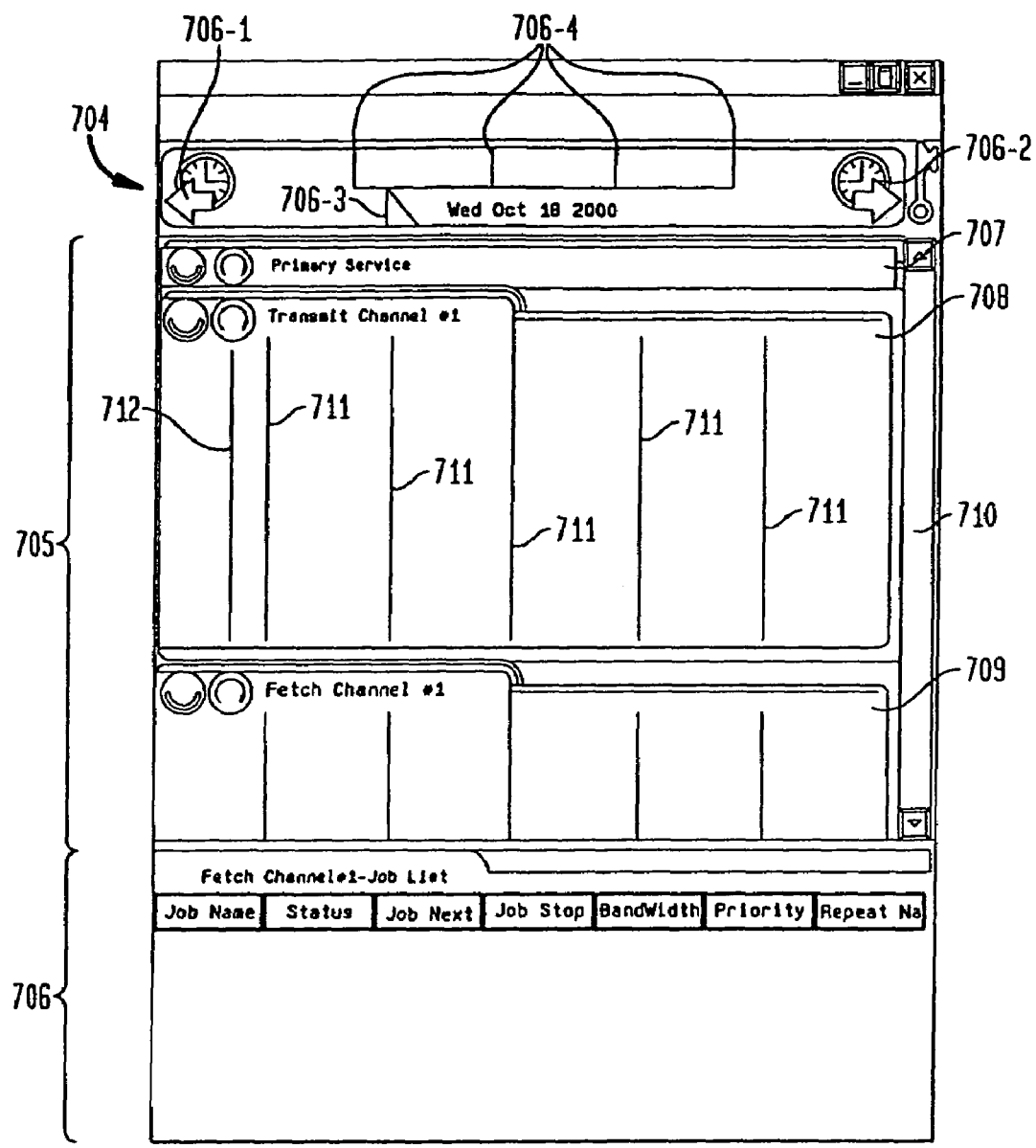

FIGS. 15-16 show the left and right hand sides, respectively, of a window that can be displayed using the GUI of the operator console 330. The left hand side of the window has a menu bar 701, an upper left hand side area 702 for displaying the hierarchical tree of defined channels and programs and a lower left hand side area 703, whose display varies. The operator of the operator console 330 can select a channel or a program in the hierarchical tree in the area 702, thereby causing properties associated with the selected item to be displayed in the lower left hand side area 703. In the example shown in FIG. 15, the channel "Fetch Channel #1" is selected in the area 702. This causes area 703 to display the properties of this fetch channel in area 703.

A new program can be created by selecting (right clicking) on the entry "Programs" in the hierarchical tree displayed in the area 702. A pop-up menu is displayed prompting the user to choose a "New Standard Program File" or a "New Web Site Program". Illustratively two types of programs are supported, namely, standard file programs, which are programs for carrying locally maintained files, and web site programs, which are programs for web site information which must first be retrieved and then transmitted as file data. This causes a program inspector pane 715 to be displayed in the area 703 as shown in FIG. 17. When this pane 715 is displayed, the operator can enter or modify the following program information parameters: the name of the program 715-1, a description of the program 715-2, the manner by which the program will be announced 715-8, i.e., private, public or mandatory, a target folder into which the program files are to be stored at the recipient node (e.g., the client nodes 240 targeted for receiving, and subscribed to, this program) 715-9, a check box 715-10 indicating whether or not a transaction log is to be kept for this program 715-11, an expiration date 715-12, a launch command 715-13, and primary and secondary images 715-14 and 715-15. The program inspector pane 715 also displays status 715-3, active jobs 715-4 (number of jobs in which this program is currently scheduled), program size 715-5 (total number of bytes of all files to be transferred for this program), file count 715-6 (total number of files to be transferred for this program) and type information 715-7 (standard file or web site). As files are added to a program, or the program is scheduled in a job, these parameters are automatically updated by the data network 302.

The announce field 715-8 enables the operator to choose the subscription and announcement for the program. A mandatory program is announced to all client nodes 240 and all client nodes 240 are required to receive the files of the program. A public program is announced to all client nodes 240 and all client nodes 240 may subscribe to it. However, only those client nodes 240 subscribed to the program will receive and use the files of the program. A private program is announced only to specific targeted client nodes 240 and only such client nodes 240 can subscribe to it. Again, only subscribed client nodes 240 will receive and use the files of such a program.

The target folder field 715-9 specifies the directory or folder at the subscribed client nodes 240 into which the files of the program are to be stored. The expiry field 715-10 specifies the time after receipt of a unique version of the files of the programs at which the files will be treated as expired (and therefore erased). Note that if the program is changed between transmissions, the client node will reset the expiry time stamp upon receipt of the modified program, thereby restarting the expiry timer.

The launch command field 715-11 enables the operator to optionally cause the automatic execution of a file upon receipt of the program. For example, in the case of a web site program, it may be desirable to enter the URL of one of the web pages which will cause that web page to be loaded and presented at the client node 240. Primary and secondary image fields 715-12 and 715-13 enable the operator to specify the file name of icons to be displayed at the client nodes 240 as representing the program.

In the case of a web site program, two additional tabbed panes are provided. These can be selected to display fields for specifying the universal resource locator (URL) of a web site whose content is to be fetched for the program. Other features can be specified by the operator including multiple URL's, depth of linked web pages to retrieve, linked web pages to be specifically included or excluded, number of retry attempts to retrieve the web page and timeouts to wait for web site material to be retrieved.

When the operator console 330 defines a new program, or modifies an existing program, it communicates the definition of the program, or the modifications to an existing program, to the primary controller 350 via the control network 301. The primary controller generates a unique 32-bit program identifier for each newly defined program and stores the new program or modifications to an existing program in the database 310 via the data network 302. The database 310 then communicates the availability of the program or program modifications to the operator console 330, the resource manager 340 and primary controller 350.

Afterward, the program is displayed in the hierarchical tree in the area 702. The operator can select any program, e.g., to modify or display its parameters. Selecting the program causes the program inspector pane 715 to be redisplayed, thereby enabling the operator to select and modify the various modifiable fields 715-1, 715-2, 715-8 to 715-13.

Also, once a program is defined, the operator can select the program and add files to the program. To do so, the operator can select the defined program then select "Add contents" from a drop down menu under the "Edit" heading of the menu bar 701. This causes a browse window to be displayed with a hierarchical listing of all folders on the left hand side of the window and a listing of all files currently to be transferred for the program on the right hand side. The operator can then chose desired files on the left hand side and drag them to the right hand side, thereby causing additional files to be selected for transfer with the program.

FIG. 16 shows a time line area 704, an upper right hand side display area 705 and a lower right hand side display area 706. The time line in the time line area shows a progression of time from an earlier point in time on the left hand side to a later point in time on the right hand side. The operator can click the left and right arrows 706-1 or 706-2 to move the displayed time window of the time line earlier or later in time. A wedge shaped time indicator 706-3 can be displayed or removed to show the current time, when the time window selected by the operator includes the current time.

The time line includes interval markings 706-4 delineating equal intervals in time. The entire time period of the time window displayed by the time line is the sum of the times of the displayed time intervals, and portions thereof. The operator can change the time interval spacing by dragging the time line to the left or to the right. As the operator does so, the interval markings 706-4 move closer to the center and additional interval marking 706-4 appear from the left and right edges of the window, or the interval markings 706-4 move away from the center of the time line and some interval markings 706-4 disappear from the left and right edges of the time window. When the interval markings become too close together or too far apart to provide a meaningful metric to the operator, their scale changes and fewer or more interval markings 706-4 are displayed to reflect the change in scale. For example, FIG. 18 shows interval markings 706-4 for minutes with each interval marking 7064 corresponding to one minute. The time window shows approximately five minutes of time. As the operator drags the time line to the left, the interval markings 7064 expand in length and fewer are shown in the time window. The total time shown may be reduced to three minutes if only three long intervals are shown. If the operator drags the time line to the right, the interval markings 706-4 move closer together and more interval markings appear. If say, ten interval markings 706-4 are shown, then the time window depicts a ten minute period. If the operator continues to drag the time line to the right, it may be too cumbersome to show more markings. Instead, at some point, the scale of the intervals is changed, e.g., from one minute to five minutes. This reduces the total number of interval markings 706-4 shown, with only those interval markings 706-4 delineating every five minute interval being shown. Illustratively, the time period of the time widow smoothly progressively depicts an increasing time period, even when the scale changes. The scale can be changed successively as the operator continues to collapse the space between interval markings 706-4, e.g., to fifteen minute, hourly, daily, etc. intervals. The operator can likewise drag the time line in the opposite direction to once again expand the space between interval markings 706-4, including changing the scale of the intervals when too few interval markings 706-4 are shown in the time window.

Area 705 shows tabbed panes 707, 708 and 709, with the pane 707 being partially occluded by the pane 708. Each tabbed pane 707-709 corresponds to a defined channel. The tabbed pane 707 corresponds to the service channel named "Primary Service". The tabbed pane 708 corresponds to the transmit channel "Transmit Channel #1". The tabbed pane 709 corresponds to the fetch channel "Fetch Channel #1". As show, the area 705 is scrollable using scroll bar 710. Channels of a given type are generally shown "stacked." That is, all of the panes of the transmit channels are overlaid on top of one another so that only the tabs of each transmit channel pane 708 are visible. Only the pane 708 of one transmit channel is shown. Likewise, the panes 709 of the fetch channels are stacked in a separate stacked so that only one pane is displayed in full at a time. To select one of the other panes 708 or 709 to view, the operator selects the tab of the pane 708 or 709. This brings the selected pane to the front or foreground. The entire pane 708 or 709 of the selected tab is displayed and the remaining portions of the other panes are occluded.

Each pane 708 or 709, when selected and visible with the area 705 displays a series of time interval markings 711, and horizontal bars 712 corresponding to scheduled jobs. The bars 712 show the expected time over which a scheduled job is to be executed relative to the time intervals represented by the time interval markings 711. A job is the scheduled transmission of a program on a specific channel and is described in greater detail below. The width of the time bar 712 corresponds to the time required to execute the job. The right edge of the job (when visible) indicating the approximate start time of the job and the left edge of the time bar 712 (when visible) indicating the approximate end time of the job.

When a pane 707, 708 or 709 is selected, by selecting its tab, the area 706 displays a list of all jobs scheduled for the channel corresponding to the selected pane 707, 708 or 709. As shown, the area 706 can display various properties of the job including: job name, status, job next time, job stop, bandwidth, priority, repeat name, etc. In the alternative, when a channel is selected from the hierarchical tree shown in area 702, the pane corresponding to the channel is brought to the foreground in area 705 and the job list for that channel is displayed in area 706.

One way to schedule a job is to drag a program shown in the hierarchical tree displayed in area 702 to a specific tabbed pane, e.g., 708, shown in area 705. If the tabbed pane is not already in the foreground, it is brought to the foreground as if selected. When the operator does this, a job inspector pane 714 is displayed in the area 703, such as is shown in FIG. 18. When displayed, the operator can specify or modify the following properties of a job: the name of the job 714-1, the job next time or next execution calendar day 714-2 and time 714-3 of the job, the channel bandwidth percentage for the job 714-4, the priority of the job 714-5 (i.e., highest, higher, high, normal, low, lower or lowest), whether or not the job is recurring (i.e., is this a one time job or a job to be repeated at some interval) 714-6, and a check box 714-10 indicating whether or not a log is to be kept for job execution. If recurring is selected, the operator can specify the interval of recurrence for the job 714-7, the schedule interval 714-8 and a name for each recurrence 714-9 to assist an operator to easily understand what is the repeat interval for the job. As may be appreciated, a recurring job will be rescheduled as specified by the parameters 714-6, 714-7 and 714-8 automatically. A check box 714-11 may optionally be provided to indicate whether or not the job requires confirmation of delivery. As described in detail below, the requirement to confirm delivery is communicated in a service announcement for each program corresponding to this job as a flag requesting that each client node receiving the programs of the job transmit a positive acknowledgement message back to the source site 201 (most notably, the ABC server 380).

Once a job is scheduled, it is displayable in the channel panes 707, 708 and 709 or listable in the area 706 when a channel is selected. When listed in the area 706, a given job can be selected to redisplay the job inspector pane 714 with the parameters set of the specific job. So long as the job is not currently executing, the operator can modify the parameters of the job.

As the operator console 330 makes any of the above changes to programs, jobs, etc., such changes are communicated via the control network 301 to the primary controller 350. The primary controller 350 stores the changes in the database 310 via the data network 302 and then such changes are available to all processes connected to the database via the data network 302, namely, operator console 330 and the resource manager 340. Among other things, this makes channel and program information is available for assembly into service announcements for communication on the service channel. Thus, when the service announcement is to be transmitted via the service channel by whichever controller 350, 360 or 370 responsible for doing so, current channel and program information can be transmitted with the announcement of available channels and programs.

When the primary controller 350 is notified of a change to the database 310, the primary controller 350 examines the change. If the change is the scheduling of a new job, the primary controller 350 determines to which control node the job should be dispatched. This is achieved by determining which control nodes were specified in the channel parameters of the channel of the job. The primary controller 350 dispatches the job to the highest rank order controller 350, 360 or 370 indicated. If an assistant controller 360 or 370 is to perform the job, the primary controller 350 sends one or more messages to that assistant controller 360 or 370 to cause that assistant controller 360 or 370 to execute the job.

A controller 350, 360 or 370 executes a job as follows. The controller determines each scheduled time at which a job is to be executed based on the job start time, job stop time, recurrence, interval and schedule interval information 714-2, 714-3, 714-6, 714-7 and 714-8 of the job. The controller 350, 360 or 370 sets appropriate timers for triggering the execution of the job at the correct specified times.

At the appropriate execution time, the controller 350, 360 or 370 causes its respective queue module 354, 364 or 374 or web module 352, 362 or 372 to actually communicate the desired program files on the respective channel of the job. In the case of a web site file to be fetched on a fetch channel, the controller 350, 360 or 370 instructs is web module 352, 362 or 372 to retrieve each web site of the program of the job. In the case of a standard file to be transmitted, the controller 350, 360 or 370 instructs its queue module 354, 364 or 374 to transmit the files of the program.

The web module 352, 362 or 372 access the web sites at the URL's specified by the program parameters of the program of the job and retrieves the web sites. This may involve communication of information via the LAN 218 and the WAN to the respective web sites. The web module 352, 362 or 372 stores the retrieved web site information in a file (which may be accessed and transmitted by another job).

The queue module 354, 364 or 374 retrieves the files of the program(s) associated with the job. The queue module 354, 364 or 374 then assembles packets of a format described below containing the program information of the program of the job and the files of the program of the job, where the files may contain locally retrievable file information. The queue module 354, 364 or 374 assembles the packets in a format and manner specified by the channel parameters of the job. For example, the packets are packetized in a format specified by the content packetizer 503-2. The packets are provided the IP address and IP port specified by the target IP address 503-7 and target IP port 503-8 parameters. The packets are transmitted by the network layer protocol specified by the network layer protocol 402-3 (which in turn specifies additional packet encapsulation). The packets are then transmitted, e.g., via the LAN 218 to the encapsulator/data injector node 214 for transmission via the forward path 202.

In the case that more than one job is specified to execute contemporaneously for the same channel, some packets are transferred alternately for each of the programs of each respective job to achieve the percentage of bandwidth set aside for each by the parameter 714-4 of each job.

Client Node Architecture

Figure 19:
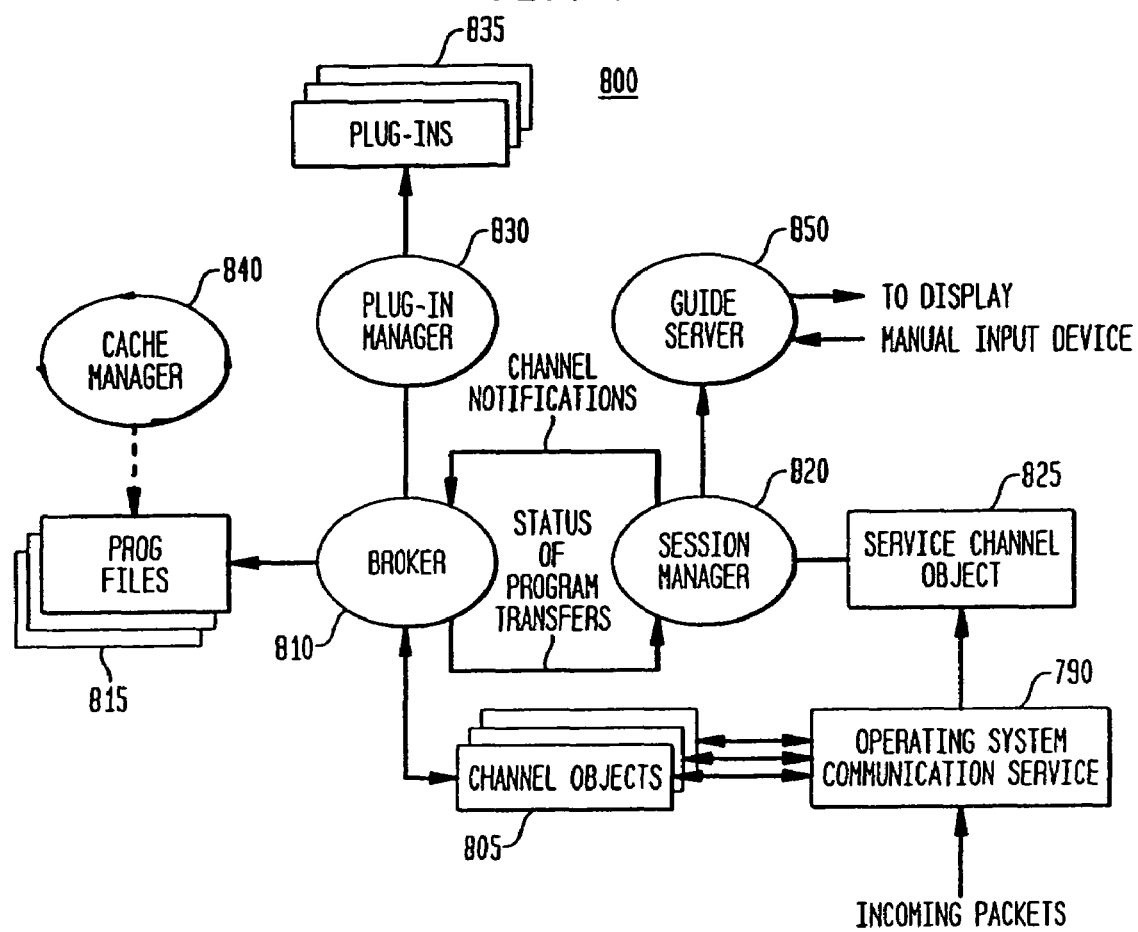
FIG. 19 shows an illustrative functional block diagram 800 of a client node 240.

FIG. 19 shows an illustrative functional block diagram 800 of a client node 240. As described above, a client node 240 can be implemented using a PC compatible (or other type of) computer or a set top box, with a processor, memory (e.g., persistent memory, such as a disk, and volatile memory, such as RAM IC's), external communication device (e.g., telephone modem, cable modem, network interface card, etc.) monitor, manual input device (mouse, keyboard, keypad) and a bus interconnecting (most if not all) these devices. In either case, the client node 240 is presumed to execute an operating system, which includes a communication service 790. As described above, the communication service 790 is capable of opening channels and separately receiving information in packets from each channel or separate sending information on a respective channel. Received information is stored in memory and is accessible via a respective channel object. The communication service 790 provides the software interface between data present in the client node 240 and packet signals transmitted or received by any such external communication device by which packet signals can be communicated.

Furthermore, the operating system communication service 790 generally supports specifying by which device (e.g., by specifying the Media Access Control address of the device) each of the transmission and receptions is to occur. As such, the processes described below need not know the underlying details by which the communication is achieved. They need merely use the appropriate application program interface (API) for the operating system communication service 790. As such service is generally supplied by the manufacturer of the client node, and the API is generally well-known, it is not described further.

Illustratively, the client node 240 includes a broker process 810, a session manager 820, a plug-in manager 830, a cache manager 840, a guide server 850, channel objects 805, program files 815, service channel object 825 and plug-ins 835.

The service channel object 825 receives announcement messages from the service channel via the communications service 790. The announcement messages illustratively are formatted according to SAP and SDP. The announcement messages announce the availability of channels and programs on such channels. As noted above, when a channel or program is defined, a "mandatory", "public" or "private" subscription is specified for each. This information about existing channels is retrieved by the controller 350, 360 or 370 responsible for transmitting the service announcement messages on the service channels and is formatted according to SAP and SDP. These messages are then transmitted to the client nodes 240. The service channel object 825 receives such announcement messages and recovers the appropriate announcements.

These service announcement messages are made available to the session manager 820. The session manager 820 retrieves the service announcement messages and stores them at the client node 240, e.g., in compact SDP form.

Figure 20:
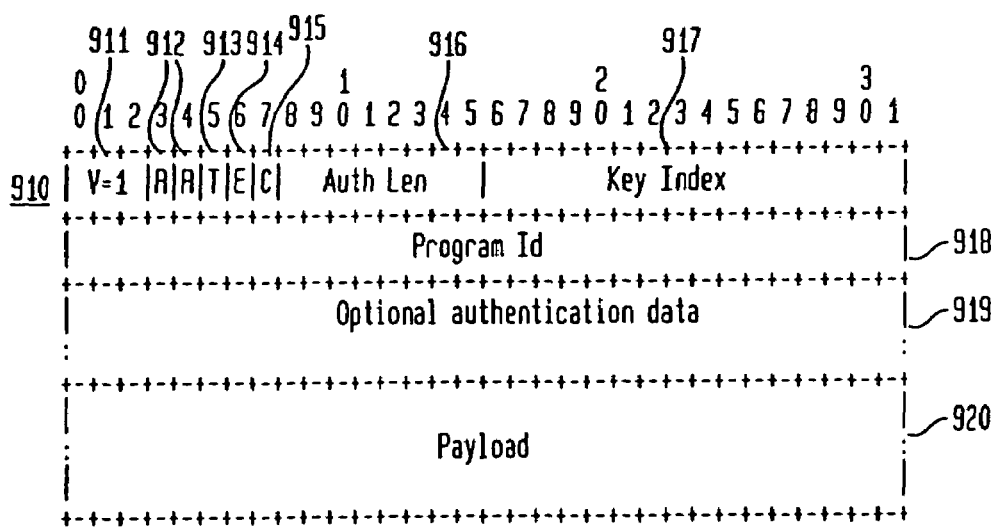
FIG. 20 shows the format of a packet 910 for carrying file data of programs.

When an operator of the client node desires to view the available channels and programs, the guide server 850 requests the session manager 820 to provide the service announcements. The appropriate service announcements are provided to the guide server 850. Illustratively, the guide server 850 formats the service announcements according to a modifiable XML specification for display on a monitor. FIGS. 19 and 20 show different views displayable on the monitor of announced channels and programs, respectively. Mandatory channels and programs are displayed as being subscribed and the operator is not able to unsuncribe to such mandatory channels and programs. Public channels and programs, and private channels and programs targeted to the respective client node 240 are also shown. The operator of the client node 240 is permitted to subscribe or unsubscribe to such public and private channels and programs by checking or unchecking the appropriate check box. Illustratively, the operator must be subscribed to a channel in order to receive programs for that channel, including mandatory programs.

The session manager 820 notifies the broker 810 of any subscriptions to channels and programs. The session manager 820 can retrieve channel and program information from the channel announcement corresponding to each subscribed channel and program and provide such channel and program information to the broker 810. In response, the broker 810 creates a channel object 805 for each subscribed channel and destroys a channel object 805 for each unsubscribed channel. Channel objects can be created using the channel information announced in a respective received service announcement of the channel. Each channel object 805 is for receiving or transmitting information for a given channel utilizing the communication service 790. The broker 810 demultiplexes from the channel objects 805 each program transmitted thereon. Often, only one program is transmitted on a channel at a time. However, as described above, it is permissible to multiplex multiple programs on a channel contemporaneously. The broker 810 also provides to respective channel objects 805 information to be transmitted from the client node on the respective return channel. Such return channels can be used for acknowledging and negatively acknowledging receipt of program information as described in greater detail below.

The broker 810 recovers file data for each program and stores the file data in the file folder or directory indicated by the program information of the program. The broker 810 also associates the appropriate icons with the program as indicated by the primary and secondary image program information of the program. The broker 810 also automatically executes the launch command specified by the program information for each program, assuming the operator has permitted auto-launching of the respective program when using the server guide 850.

The plug-in manager 830 is notified by the broker 810 when a file is received which corresponds to a given plug-in. The plug-in's are processes designed to operate with other compiled processes according to a defined API. In response, the appropriate plug-in may execute using the file as an input for processing. Illustratively, plug-ins are supported for Internet Explorer™, Apache™ and an auto-upgrade plug-in for automatically upgrading the software of the client node 240 (most notably, the software of the processes and objects 800).

The cache manager 840 performs several housekeeping tasks. On a time triggered basis, the cache manager 840 performs a checksum on received file information, looks for missing files and portions thereof and determines if any program files have expired (i.e., with reference to the program information of the respective program and timestamp information associated with each program file). As noted above, when files are received, they are time stamped. If a program is transmitted again in identical form, the time stamps are not changed. If the program is transmitted again and is at least partly different, the time stamps of the files are reset. If the difference between the current time and the time stamp of a file is greater than the expiry program information associated with a file, the file is deleted by the cache manager 840. In terms of missing file information, it is the cache manager 840 which determines which ranges of data words (e.g., bytes) of each program file were successfully received and which were not received (or received with errors). The cache manager 840 notifies the broker 810, which in turn transmits messages as described below indicating that certain ranges of data were not received for given program files, or alternatively, positively acknowledges receipt of program files.

Program Communication Packet Format

FIG. 20 shows the format of a packet 910 for carrying file data of programs. This packet would form all or part of the unit of information 102 shown in FIG. 3. The packet 910 has a version field 911 indicating the version of the protocol by which the packet may be parsed. Illustratively, the version may be set to 1 initially. Following this is a reserved field 912 whose use is not yet defined. Following the reserved field 912 is a type field 913. This field 913 can contain a first value (e.g., 0) to indicate that the packet contains an original transmission of the file data, or a second value (e.g., 1) to indicate that packet contains "repair" data, i.e., a retransmission of the original data. As described in greater detail below, repair data generally is transmitted only for a limited number of ranges of data words of program file data—not for an entire file. That is, for sake of conservation of bandwidth, only the data ranges not received are retransmitted.

Following the type field 913 is an encryption field 914, which can contain a value indicating that the payload is encrypted (when set to 1) or not encrypted (when set to 0). Next, compressed field 915 is provided which indicates whether or not the payload is compressed. For example, a value of 1 can indicate that the payload is compressed and a value of 0 can indicate that the payload is not compressed. Illustratively, the payload is compressed and/or encrypted at the source site 201, e.g. by a controller 350, 360 or 370 prior to transmission. If the file data is both compressed and encrypted it is illustratively first compressed and then encrypted. Compression may be achieved using the zlib technique described in P. Deutch & J.-L. Gailly, "Zlib Compressed Data Format Specification Version 3.3," IETF RFC 1950 (May 1996)("http://www.ietforg/rfc/rfc1950.txt?number=1950").

An authentication length field 916 is provided for indicating the size of the authentication value in field 919. The authentication value is for authenticating the packet 910. If the authentication length is set to zero, no authentication field 919 is present. The authentication value in the field 919 can be a digital signature, such as an "MD5" hash of the packet payload (as encrypted compressed or both). See R. Rivest, "The MD5 Message Digest Algorithm," IETF RFC 1321 (April 1992) ("http://www.ietf.org/rfc/rfc1321.txt?number=1321"). Authentication can be achieved by, the client node 240 extracting the number of bytes indicated by the authentication length field 916 between the program identifier 918 and the payload 920 as the authentication value carried in the packet 910. Next, the client node 240 decrypts the value in the authentication field 919 using a public key, hashes the payload contents and compares the decrypted authentication value to the hash value.

If the packet is encrypted, an index is provided in the key index field 917. This index, when combined with the program identifier in program identifier field 918, can be used to index the correct key at the client node for decrypting the payload 920. The program identifier field 918 contains the 32-bit unique program identifier assigned by the controller 350 to the program whose contents are carried by the packet 910.

The payload 920 contains a sequence of one or more triplets, each triplet being generated in the tag-length-value format. Each tag identifies the type of data of the triplet and each length indicates the offset in bytes to the next triplet. The value contains the parameter or data itself. Note that a value can have padding attached to it and therefore the length of the triplet need not be precisely indicative of the exact length of the value. The following table summarizes certain tags defined for use in the payload:

TABLE 1

| Tag | data type | Description |
| --- | --- | --- |
| FileNumber | int64 | File number of the program (e.g., this file 16 of 345) |
| FileSize | int64 | Total no. of bytes in this file (e.g., file 16 has 234 bytes) |
| ByteOffset | int64 | Byte offset from beginning of file at which to put this data) |
| FileVersion | long | Last write time of file |

TABLE 1-continued

| Tag | data type | Description |
|---|---|---|
| ExpectedFiles | int64 | Total no. of files expected to be received for this program |
| FileName | UTL8* | File name of this file |
| JobUUID | GUID | Global identifier of job this packet is for |
| Content | Byte+ | Actual file contents |

Illustratively, the file name is only transferred in the first packet of sequence of packets carrying the file data of a given file. Likewise, the jobUUID illustratively is only carried in the first packet of a sequence of packets carrying data for a given job. Preferably, unless the file a file is very short and can be carried in one packet, the first packet for a file does not include a content triplet (i.e., has no actual content data of the file, just the meta-data file number, file size, byte offset, file version, expected files, etc.) Additional types of triplets can be defined, up to 255 total triplets. This limitation is imposed by the length of the tag field (one byte). Each triplet can have a length up to 1020 bytes total, inclusive of tag and length field. This limitation is imposed because the length field of a triplet is one byte and measures lengths of the range of 0 to 255, four-byte increments. Note that a triple with the length field containing the value 0 represents the last triplet in a sequence of a packet. A client node 240 is required to be able to skip over each triplet it does not recognize and read/parse the remaining triplets of the packet that it can recognize. The controllers 350, 360 and 370 can download a file containing tag definitions for triplets.

Asynchronous Negative Acknowledgement

Illustratively, the system 200 of FIG. 2 employs an "asynchronous back-channel" ("ABC") extension to PGM for ensuring delivery of data to the client nodes 240. First, to enable ABC, an ABC announcement must be communicated on the service channel. Illustratively, the ABC announcement is a special form of service announcement which is created for each scheduled job having a channel with the reliable channel information 503-4 selected. The ABC announcement is formatted according to SAP/SDP and includes information such as the IP multicast group and port for the ABC server 380 (so client nodes 240 know to which address they must send packets when communicating with the ABC server 380) and the "domain name server" ("DNS") name of the network element 205 to which client nodes 240 are to send their ABC requests.

When the service announcement for individual channels is sent, each service announcement includes the unique channel identifier of the channel and a flag indicating whether or not the client node 240 can send asynchronous negative acknowledgement packets for the channel. Likewise, service announcements announcing new programs include a program identifier and flags indicating whether or not the client node 240 can send asynchronous negative acknowledgement packets or positive acknowledgement packets for the respective program. Such packets, and when they are sent, are described in greater detail below.

Figure 21:
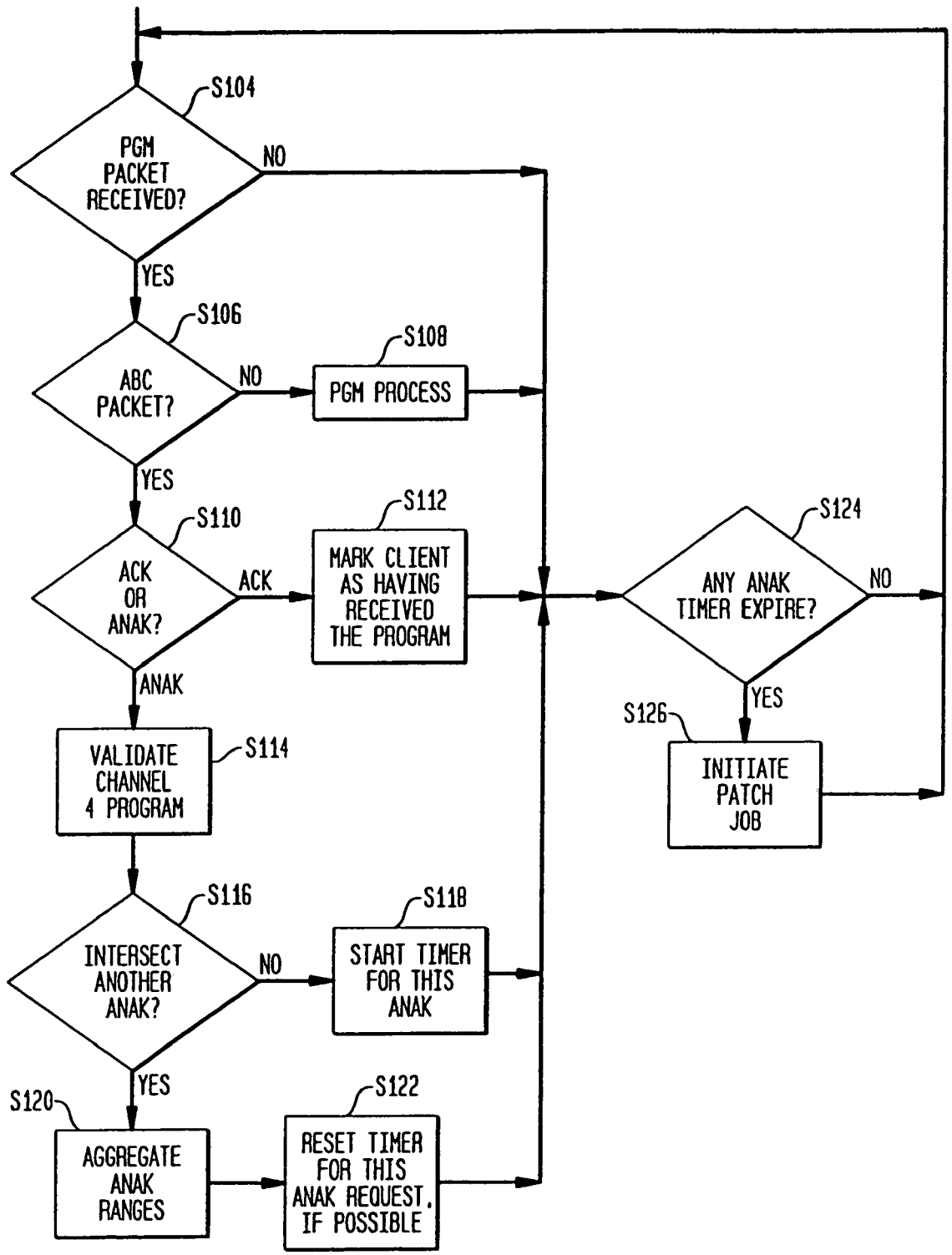
FIG. 21 shows a process carried out by an ABC server.

FIG. 21 illustrates a method carried out by the ABC server 380. The ABC server 380 executes these steps for each completed job. In step S104, the ABC server first determines if a PGM packet was received. Illustratively, the queue module 384 utilizes the communication service of the operating system of the computer on which it runs to easily retrieve communicated information. PGM packets have an easily identifiable structure. Non-PGM packets are ignored and discarded by the ABC server 380. The ABC server 380 would simply proceed to steps S124-S126 (described below) if a non-PGM packet was received. If a PGM packet was received, in step S106, the ABC server 380 next determines whether or not the packet is an ordinary PGM packet or an ABC packet described below. If the packet is an ordinary PGM packet, the ABC server 380 performs ordinary PGM processing according to the well-known PGM protocol in step S108. Such ordinary processing involves creating a patch job with all of the original program data and scheduling such a job for execution. The ABC server 380 then executes steps S124-S126 as described below.

If the packet is an ABC packet, the ABC server determines what type of ABC packet was received in step S110. Two types of ABC packets can be received, namely, a positive acknowledgement packet or an asynchronous negative acknowledgement packet, whose structure and purpose are described in greater detail below. If the ABC packet is a positive acknowledgement packet or "ACK" packet, the ABC server 380 executes step S112 wherein a log, e.g., a billing log, entry is created noting affirmative receipt of the program by the respective client node 240 which sent the ACK packet. The ABC server 380 then executes steps S124-S126 as described below.

If, on the other hand, the packet is an asynchronous negative acknowledgement or "ANAK" packet, the ABC server 380 executes S114 wherein the ABC server 380 validates that the channel and program identifiers of the received ANAK packet are still valid. Specifically, some time may have elapsed between the original transmission of the original program data and the receipt of the ANAK packet. This may happen, for example, because the client node 240 which initiated the ANAK packet might not have had an available return channel until shortly before the ANAK packet was received at the ABC server 380. In a satellite communication network, where the client node 240 is, or is connected via, a satellite IRD type of set top box, the return channel may only be activated once per day, e.g., at night. During the time between the original transmission of the program data and the receipt of the ANAK packet, the channel or program may have been deleted by the operator of the resource manager 340 or operator console 330. If so, the ABC server 380 simply deletes the ANAK packet and does not retransmit the data it requests.

If, on the other hand, the channel and program can be validated, the ABC server 380 next executes step S116 in which the ABC server 380 determines if the received ANAK packet has a request that "intersects" a request in another ANAK packet. As described in greater detail below, ANAK packets request the retransmission of data in a list of ranges. ANAK requests are said to intersect if they pertain to the same program. They can be requests for the same range of data words in the same file, requests for sequentially contiguous ranges for the same file, requests for non-contiguous ranges of data for the same file or requests for ranges of data in different files of the same program. If the ANAK packet requests do not intersect then, in step S118, the ABC server 380 buffers the request of the ANAK packet and starts a countdown timer and then proceeds to steps S124-S126 described below.

If the ANAK packet includes a request that intersects the request of a previous ANAK packet, then the ABC server 380 executes step S120. In step S120, the ABC server aggregates the request of this ANAK packet into the intersecting request. In effect, the ABC server forms the union of the ranges of the two requests and buffers this merged ANAK request in place of the previously received ANAK request. In addition, multiple non-contiguous ANAK requests, i.e., for the same or different files of the same program, can be consolidated into a single ANAK packet. Then, in step S122, the ABC server resets the time of the previously received ANAK request, if possible. Illustratively, there is a definable limit to the number of times that the countdown timer for an ANAK request can be reset. If exceed, the timer is not reset.

The ABC server 380 may proceed to step S124 via step S104, step S108, step S112, step S118 or step S122. In step S124, the ABC server determines if the countdown timer for any ANAK request has expired. If not, the ABC server 380 proceeds to step S104. If any ANAK countdown timer has expired, the ABC server generates a patch job for each ANAK request whose timer has expired in step S126. Illustratively, a patch job is a scheduled job as described above for retransmitting the program on the same channel it was originally transmitted on. However, only the ranges of data in the ANAK request are retransmitted.

Note that ANAK requests are consolidated in step S120 and moreover further consolidated by network elements as described below. For example, it is entirely likely that several nodes 240 request retransmission of at least some ranges in common. For example, in a satellite system, it is possible for a local event to affect many client nodes in the same geographic area, such as a "rain-out" (precipitation degrading the satellite signal such that data is corrupted). This may result in all of the client nodes 240 in that area transmitting requests to receive the similar missing ranges of program file data. Nevertheless, all requests from multiple client nodes 240 for the same range of data can be satisfied with one retransmission of the range of data. This is because the retransmission of the data (as well as the original transmission) is a multicast transmission to all of the client nodes 240.

Figure 22:
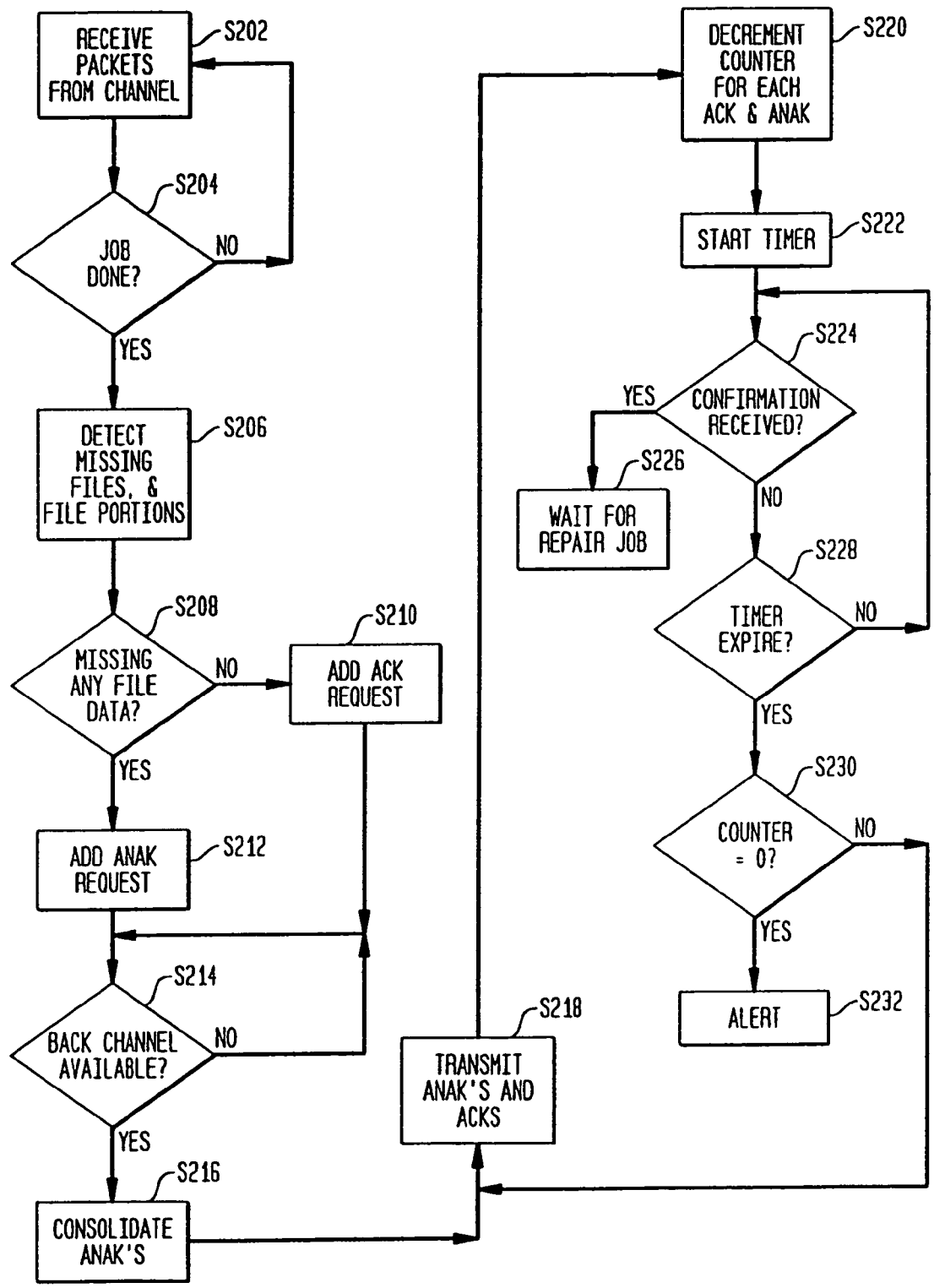
FIG. 22 shows a process carried out by client nodes.

FIG. 22 shows the process carried out by the client node 240 in accordance with the ABC extension to PGM. Illustratively, these steps are primarily carried out by the cache manager 840, the broker 810, and one of the channel objects 805 specific to transmitting return messages on a back channel to the appropriate network element 205. As noted above, the specific network element 205 to which messages should be transmitted is indicated in a service announcement message which announces the availability of the program.

Assume that the session manager 820 detects an announcement for a program on a specific channel which specifies both reliable delivery and confirmation. Assume also that the client node 240 subscribes to the channel and program (either by operator interaction or automatically). The session manager 820 communicates the subscription to the broker 810. In step S202, the channel object 805 for the channel receives the program file information and the broker 810 demultiplexes and stores the program file information at the client node 240.

The cache manager 840 periodically executes. Among other things, the cache manager 840 determines if each specific job is complete in step S204. This can be determined based on the bandwidth of the channel, the amount of information to be computed and the approximate start time of the job. If a given job has not yet completed, the cache manager 840 takes no further steps associated with ensuring reliability for that job. If a job has completed, the cache manager 840 examines the files for each program to determine if any files are missing in step S206. In addition, in step S206, the cache manager 840 performs parity checks or other error detection on each portion of a file. For example, the cache manager 840 can examine each block of data of a fixed size, e.g., 1024 bytes (with the exception of the final block of file data which may have less than the fixed amount). The cache manager 840 determines in step S208 whether or not there is any missing program file data for the job. If not, the cache manager 840 adds an ACK request message in a list of messages to be transmitted on the back channel, when the back channel is established, and proceeds to step S214. Note, step S210 is not executed if a confirmation is not indicated as required in the service announcement for this job and ABC processing ceases for that job.

On the other hand, if any file data is missing, an ANAK request is generated for each missing file or portion thereof in step S212. Missing file portions generally are in the form of ranges of data words (bytes). For example, each range can correspond to a given block.

The broker 810 waits until a back channel becomes available. Note that the client node may be of the type which only opens a back channel at certain scheduled times. For example, many satellite IRD's (set top boxes) have a telephone return path which is only activated at specific times for sake of conserving the costs to use the telephone line. Alternatively, the communication device which normally provides full-time back channel service may be temporarily malfunctioning or temporarily taken off-line for servicing. Thus, in step S214, the broker 810 determines if a back channel is available. If not, the borker 810 continues to execute step S214.

If a back channel is available, the broker 810 executes step S216. Instep S216, the broker 810 scans the pending ANAK requests and consolidates ANAK requests for the same program and channel. For example, ranges are consolidated where possible to make one range of contiguous data words for which transmission is to be re-requested. In addition, within the constraints of ABC packet size, one or more lists of multiple requests for non-contiguous ranges of data words of the same program and channel are combined into a single packet. In step S218, the broker 810 transmits ACK and ANAK packets for the pending ACK and consolidated ANAK requests. ACKs and ANAK packets are transmitted on the appropriate channel to the correct network element for the respective programs and channels to which the ACK and ANAK packets pertain. In step S220, the broker 810 decrements a transmission counter for each request corresponding to a transmitted ACK or ANAK packet.

Note that the consolidation of ANAK requests causes fewer packets to be transmitted. That is, more than one range of data words which failed to be received in usable form are negatively acknowledged with a single ANAK packet.

In step S222, the broker 810 starts a timer for each ACK and ANAK packet. In step S224, the broker 810 determines whether or not a confirmation is received for one of the ACK or ANAK packets previously transmitted in step S220. If so, additional steps may be necessary in the case of a confirmed ANAK packet. For example, in step S226, the broker 810 may wait for file data to be received in a "repair" job. Repair jobs are announced using service announcements on the service channel and cause the broker 810 to automatically receive and store the requested retransmitted data in the appropriate location of the program files. In this way, the retransmitted program file data repairs or replaces missing or errored program file data in the original transmission.

If a confirmation is not received, in step S228, the broker 810 determines if the timer has expired for any ACK or ANAK packets transmitted in step S220 but for which no confirmation packet has been received in step S224. If not, the broker 810 returns to executing step S224. If, on the other hand, the broker 810 determines that one of the timers has expired, the broker 810 executes step S230. In step S230, the broker 810 determines whether or not the transmission counter for the respective unconfirmed ACK or ANAK message is zero. If so, the broker 810 communicates an alert in step S232 as this indicates that some program file data will likely not be received completely. On the other hand, if the counter is not zero, the broker returns to step S218, whereby the respective ACK or ANAK packet is retransmitted to the appropriate network element, and the transmission counter is decremented again in step S220. Steps S222-S230 are repeated.

Figure 23A:
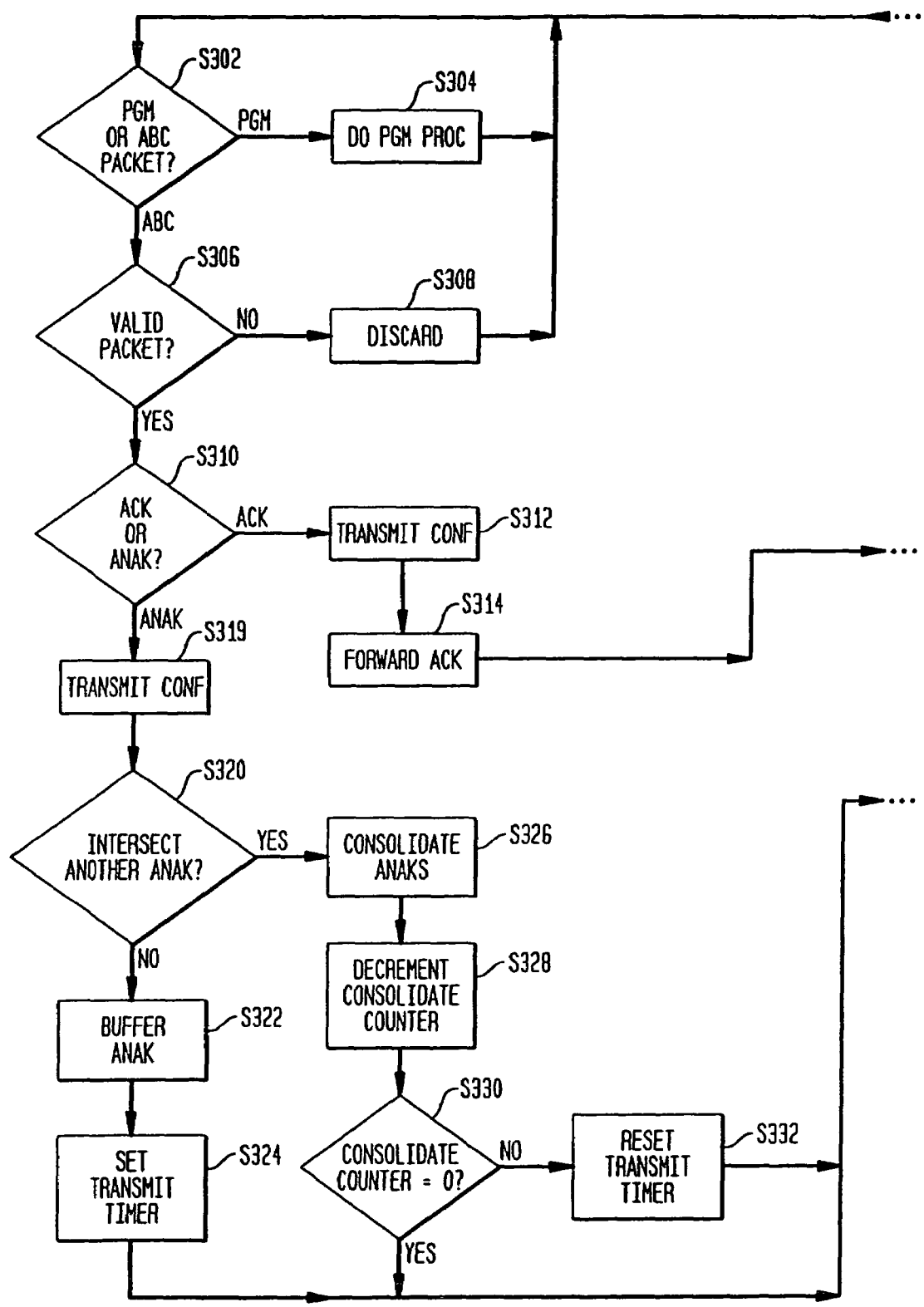
FIG. 23 shows a process carried out by a network element.
Figure 23B:
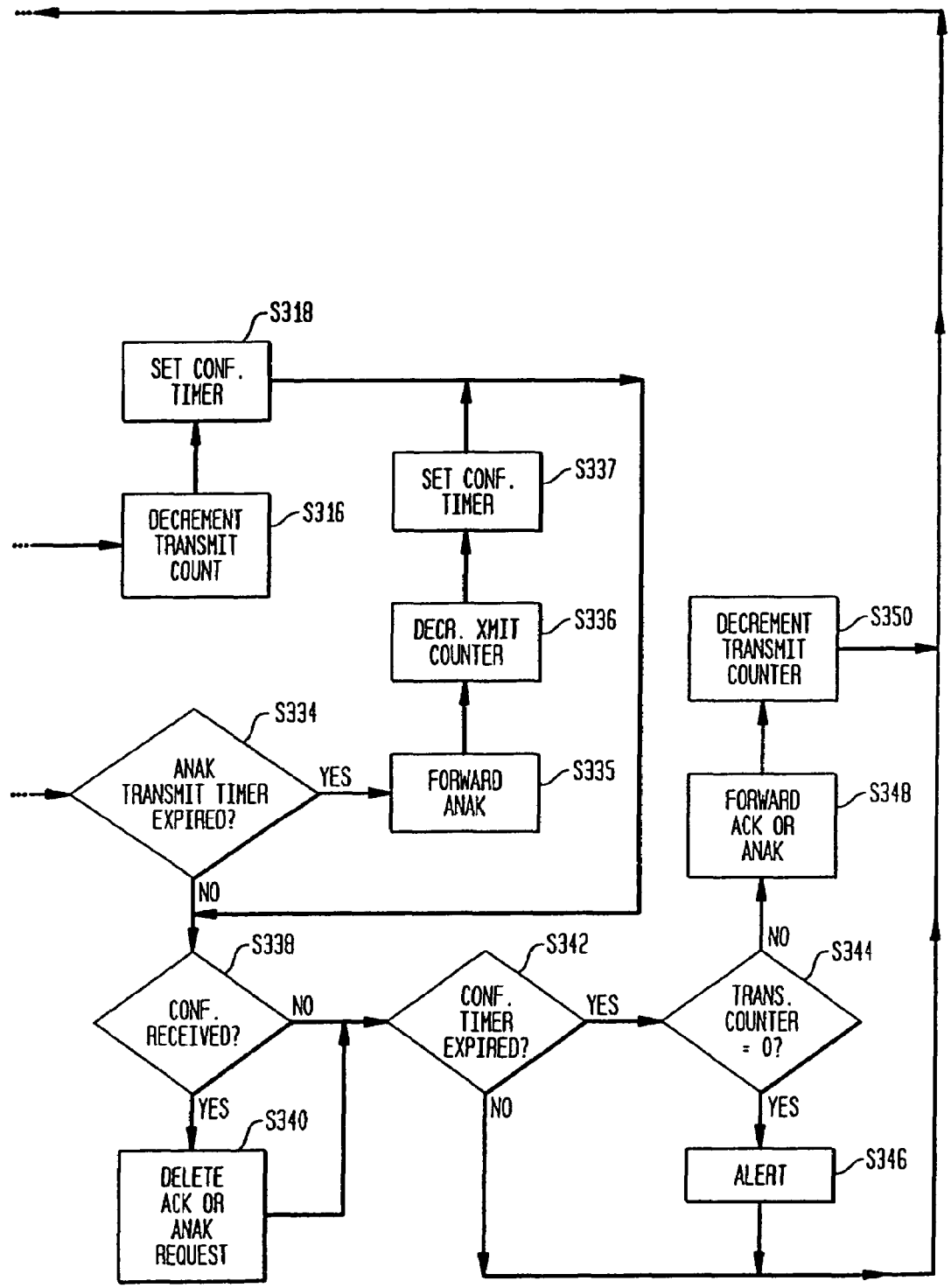

FIG. 23 illustrates a process carried out by a network element 205. Illustratively, a network element 205 has the appropriate operating system for providing communication services as does a client node 240 or control node 350, 360, 370.

In step S302, when a PGM packet is received, a network element 205 determines if the packet is an ordinary PGM packet or an ABC packet. This can be easily determined by examining the contents of the PGM packet, as described below. If the packet is a PGM packet, then the network element 205 performs ordinary PGM processing in step S304 and returns to step S302. If the packet is an ABC packet, the network element 205 next determines if the packet is valid in step S306. For example, the network element 205 can verify the checksum of the packet, that the syntax of the patent is correct and that the correct network layer multicast address is present in the packet. If the packet is invalid, the network element 205 discards it in step S308 and returns to step S302.

If the ABC packet is valid, the network element 205 determines whether the received packet was an ACK or an ANAK packet in step S310. If the packet is an ACK packet, the network element executes steps S312-S318. In step S312, the network element 205 transmits back to the sender of the ACK packet a positive acknowledgement confirmation packet ("AACF"). In step S314, the network element forwards the received ACK packet to the appropriate recipient (i.e., the controller 350, 360 or 370 which transmitted the original data to which the ACK packet corresponds, or another network element). In step S316, the network element 205 decrements a transmission counter for the ACK packet. In step S318, the network element 205 starts a confirmation timer. The network element S205 would then execute step S338 described below.

On the other hand, if the packet is an ANAK packet, the network element 205 first transmits an asynchronous negative acknowledgement list confirmation ("ANCF") back to the node which transmitted the ANAK packet in step S319. Next, in step S320, the network element determines if the request in the received ANAK packet intersects the requests in other ANAK packets received for the same job. If not, then in step S322, the network element 205 buffers the ANAK request and starts a transmit timer in step S324. The network element then proceeds to step S334.

If one or more ranges of the received ANAK packet intersects a range of another buffered ANAK request, then the network element 205 executes step S326. In step S326, the network element 205 consolidates the received ANAK packet with an intersecting ANAK packet. As noted above, consolidation can include modifying a request to specify a larger range of data words, specifically, covering the union of ranges for multiple requests or an accumulation of multiple ANAK requests into a single ANAK packet. In steps S328, the network element 205 decrements a consolidation counter of the consolidated ANAK request. In step S330, the network element 205 determines if the consolidation counter is less than or equal to zero. If so, the network element 205 proceeds directly to step S334. If not, the network element 205 resets the transmission timer of the consolidated ANAK request in step S332 and then proceeds to step S334.

In step S334, the network element 205 determines whether or not a transmit timer has expired. In not, the network element 205 proceeds to step S338. If a transmit timer has expired, in step S336, the network element 205 forwards a packet containing the (consolidated) ANAK request corresponding to the expired timer in step S335. In step S336, the network element 205 decrements a transmission counter for the transmitted ANAK packet. Then in step S337, the network element 205 starts a confirmation timer for the transmitted ANAK packet. The network element 205 then proceeds to step S338.

In step S338, the network element 205 determines whether or not an ANCF or AACF confirmation packet was received. If not, the network element 205 executes step S342. If so, the ACK or ANAK request corresponding to the received confirmation is deleted and all timers and counters associated with that request are deallocated in step S340. Step S342 is then executed. In step S342, the network element 205 determines whether or not a confirmation timer has expired. If not, the network element 205 proceeds to step S302. If a confirmation timer has expired, the network element 205 determines if the transmission counter, associated with the request whose confirmation timer expired, equals zero. If so, this indicates that the upstream network element 205 or controller 350, 360 or 370 is incapable of confirming the forwarded request. Ass such, in step S346, the network element 205 issues an alert message and then returns to step S320. If the transmission counter is not zero, the network element 205 again forwards to the next upstream network element 205 or controller 350, 360 or 370 a copy of the ACK or ANAK packet which failed to be confirmed as received, in step S348. Next, in step S350, the network element 205 decrements the transmission counter of the network element 205.

Thus, multiple ANAK requests are consolidated. Specifically, multiple ANAK requests are merged into a single larger range of blocks, or multiple ANAK requests from different packets are placed in the same ANAK packet, or both. This reduces the load on the system.

It is assumed in the above example that the network elements 205 cannot issue repair data for the ranges requested by the client node(s) 240 which issued the ANAK. However, in certain embodiments, the network elements 205 may have copies of the data thereby enabling them to issue the repair packets themselves. If so, then instead of forwarding the ANAK in step S335, the network element 205 can issue packets containing as much requested repair data as the network element 205 has. The network element 205 would then only place in an ANAK packet those ranges for which it lacks the repair data (if any). The network element 205 would then forward the more limited ANAK packet, i.e., the ANAK packet containing the list of only those ranges for which it lacked the requisite repair data.

ABC Packets

Figure 24:
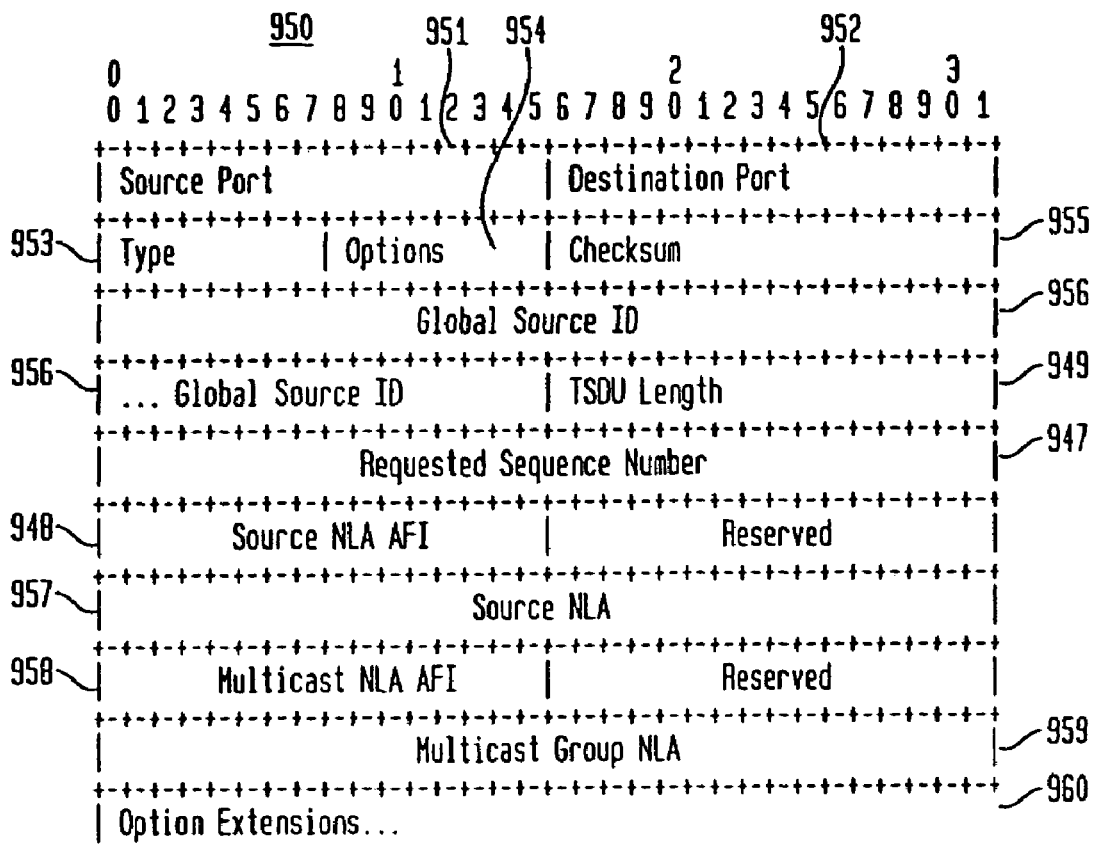
FIG. 24 shows the format of an ABC packet.

FIG. 24 shows an illustrative ABC packet 950. Like PGM packets, the ABC packet 950 shown in FIG. 24 is a transport layer packet which would be the payload of a network layer packet.

Source port field 951 contains a random port number generated by the source, in this case, the ABC server 380. Destination port field 952 contains a globally well-known identifier assigned to PGM packets. Type field 953 contains one of four values which are not currently assigned according to the PGM protocol, namely, 0×20 to designate an ANAK packet, 0×30 to designate and ANCF packet, 0×21 to designate an ACK packet and 0×31 to designate an AACF packet. Options field 954 indicates certain options. In this embodiment, option bit 0 will be set to 1 when options extensions are present. Checksum field 955 contains the 1's complement of the 1's complement sum of the entire packet, including its header. Note that the checksum in the checksum field 955 must be recomputed if the contents of an ABC packet are changed by a network element 205 or other intermediary node. Global source identifier field 956 contains a non-changing unique identifier of the ABC server 380. TSDU length field 949 contains the length of this transport layer data unit, exclusive of the transport header.

For ABC packets, the request sequence number field 947 contains 0x00000000. This is normally a value which is not allowed in PGM. That is, PGM requires this field to indicate the sequence numbered packet of original data to which the message pertains (e.g., the particular original data packet being negatively acknowledged). The reason is that am invalid sequence number is used because ABC packets do not correspond to a single particular original data packet; they either correspond to all of them (in the case of an ACK) or a list of packets (in the case of an ANAK).

Source authority format identifier field 948 contains information regarding the format of the source network layer address in source network layer address field 957. Illustratively a network layer address for contacting the ABC sender is contained in the source network layer address field 957. Likewise, multicast authority format identifier field 958 contains information regarding the format of the multicast network layer address in multicast network layer address field 959. The multicast address used to transmit the original data on its respective channel is contained in the multicast network layer address field 959.

Figure 25:
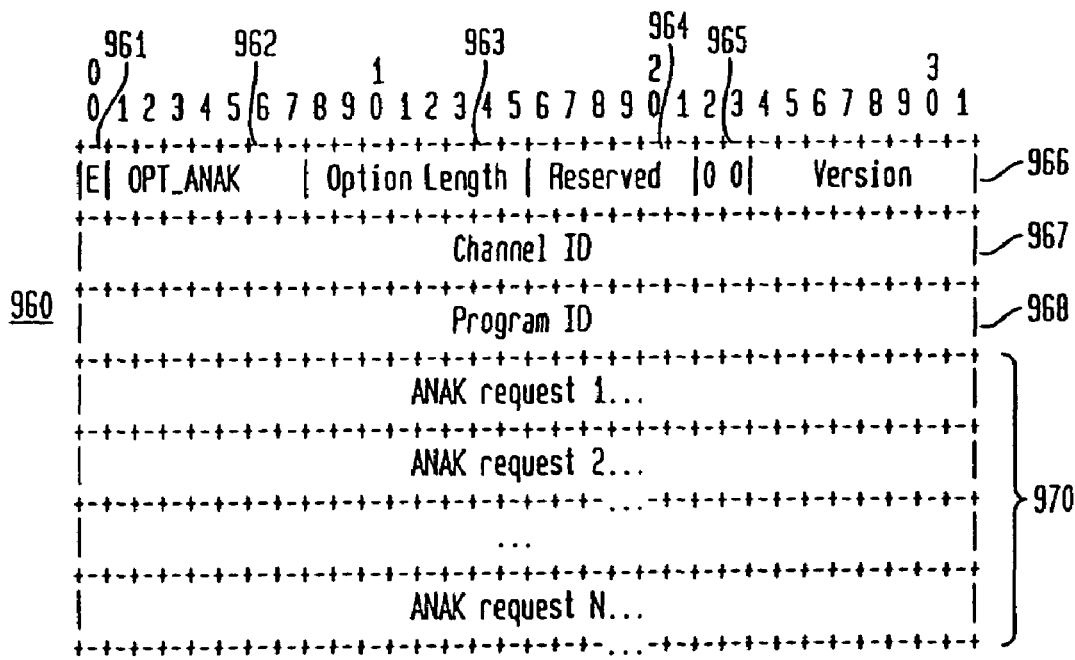
FIG. 25 shows the format of the options extension field for an ANAK packet.

Optional extensions field 960 is provided and used as follows. As shown in FIG. 25, in the case of an ANAK packet 950, the options extension field 960 includes an option end field 961 which is set to 1, to indicate that this is the last option field in the packet, or set to 0 otherwise. Options type field 962 contains a value OPT_ANAK identifying the packet as an ANAK packet. Options length field 963 contains a value indicating the length of this options field. Reserved field 964 has no currently defined use. Next, option extension treatment field 965 contains value '00' to cause network elements 205 that do not understand how to use this option to discard the entire option field. Version field 966 contains a value corresponding to the version of ABC to which the option is pertained. It can be set to the value 1. Channel identifier field 967 contains the channel identifier of the channel, and program identifier field 968 contains the program identifier of the program, for which this ANAK packet is negatively acknowledging packet receipt. These channel and program identifiers are described above.

Figure 26:
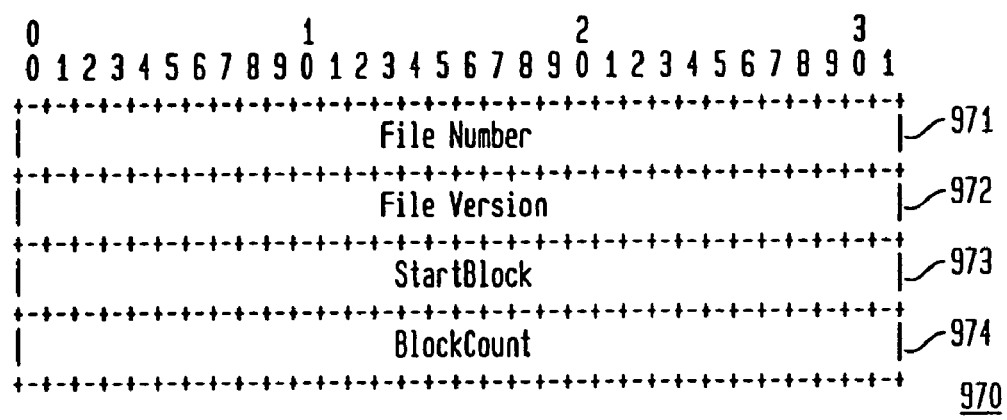
FIG. 26 shows the format of an ANAK request.

Following the program identifier field 968 are one or more ANAK requests which each have the same format. FIG. 26 shows the format of an ANAK request 970. Each ANAK request 970 includes a file number field 971, a field version field 972, a start block field 973, and a block count field 974. The file number field 971 contains the file number of the file for which some data was not received in usable form. The file version field 972 contains the file version of that file. The start block field 973 contains the first block of data which was not received in usable form and the block count field 974 contains the number of contiguous blocks beginning with the start block which were not received or received with errors. Illustratively, files are carried in blocks, e.g., 1024 bytes of data. The "granularity" of the ranges by which file data is assessed as usable or errored is the block. Thus, the range of data for which an ANAK request issues is a range of one or more contiguous blocks. When two ranges of data in different ANAK requests for a given file are consolidated, a determination is made as to whether the union of the two ranges would form a contiguous sequence of blocks. If so, the start block and block count fields are updated to contain values specifying this contiguous range formed from the union of the two ranges. If the union of the ranges is not a single contiguous series, then one ANAK request can simply be added to the option extension field 960 of an existing ANAK packet.

Figure 27:
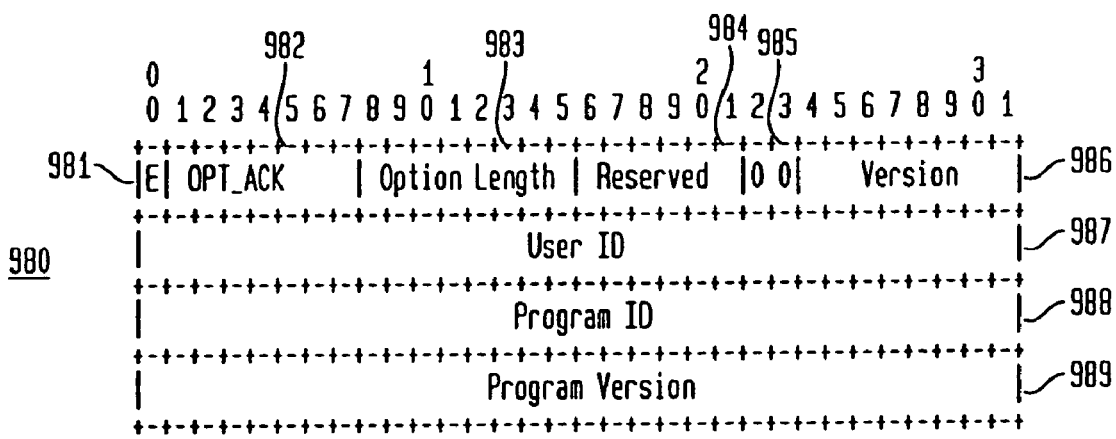
FIG. 27 shows the format of the option extension field for an ACK packet.

FIG. 27 shows the format of the option extension field 980 for an ACK packet. The option extension field includes an end field 981, a type field 982, and option length field 983, a reserved field 984, option extension treatment field 985 and version field 986. The type field includes the value OPT_ACK corresponding to an ACK request. The other fields 981 and 983-986 have similar values as the option extension field 960 for an ANAK packet. The options extension field 980 for an ACK packet also has a user identifier field 987, a program identifier field 988 and a program version field 989. The user identifier field contains a unique 32 bit user identifier assigned by the primary controller 350 to the client node 240 which originated this ACK request. The program identifier field 988 contains the program identifier of the program which that client node 240 is positively acknowledging as received. The program version field 989 contains the version of the program which the client node 240 is positively acknowledging as being received.

The invention has been described herein by reference to illustrative embodiments. Numerous alternative embodiments may be devised by those skilled in the art without departing form the spirit and scope of the following claims.

The claimed invention is:

1. A graphical user interface depicting a time line comprising:
    (a) a display screen, depicting a time line with interval markings spaced according to a particular scale, a total duration in time being the sum of time intervals, and portions thereof, depicted by the interval markings on the time line, and
    (b) a manual control for altering the time scale of the time line, which, when activated to expand the time scale, causes the spacing between the interval markings to increase and the total duration of time of the time line to decrease, and when activated to collapse the time scale, causes the spacing between the interval markings to decrease and the total duration of time of the time line to increase.

2. The graphical user interface of claim 1 wherein the display also depicts a scheduled event as a solid line running parallel to an elapse of time according to the time line over intervals during which the event takes place.

3. An operator console graphical user interface comprising:
    (a) a first displayable area depicting a time line,
    (b) a second displayable area, adjacent to the first displayable area, depicting plural tabbed panes, each tabbed pane corresponding to a channel and having a portion which is always visible and selectable to cause the remainder of that tabbed pane to become visible, thereby occluding other portions of other tabbed panes, each tabbed pane, when selected, depicting time intervals of a certain scale, and depicting one or more jobs scheduled for execution, with the channel corresponding to the selected pane, during the depicted time intervals of the corresponding pane, as solid lines extending over one or more of the time intervals to represent a time during which the job executes, wherein a job is a scheduled communication of a program on a channel, the program including program information, indicating to a recipient node how to use best-effort program events contained in the program, the channel having channel information, indicating a manner of communicating the program.

4. The operator console graphical user interface of claim 3 further comprising:
(c) a third displayable area depicting a hierarchical list of selectable channels, and
(d) a fourth displayable area depicting properties of a selected channel, including channel information dictating the respective manner of communicating data on the selected channel;
wherein, in response to manual input, each channel listed in the third area is individually selectable and wherein the fourth displayable area displays the properties of whichever one of the channels listed in the third displayable area is currently selected.

5. The operator console graphical user interface of claim 4 further comprising:
(e) a menu display area including at least one selectable menu key, wherein one of the selectable menu keys is responsive to manual input, while a particular one of the programs listed in the third displayable area is selected, to select individual files to carry in the respective selected program.

6. The operator console graphical user interface of claim 3 further comprising:
(e) a third displayable area depicting a hierarchical list of selectable programs, and
(f) a fourth displayable area depicting properties of a selected program, including program information indicating to a recipient node how to use the selected program,
wherein, in response to manual input, each program listed in the third area is individually selectable and wherein the fourth displayable area displays the properties of whichever program listed in the third area is currently selected.

7. The operator console graphical user interface of claim 6 wherein at least one of the properties displayed in the fourth displayable area is modifiable in response to manual input.

8. The operator console graphical user interface of claim 3 further comprising:
(c) a third displayable area depicting a table of information corresponding to each job scheduled for the channel corresponding to the selected tabbed pane in the second displayable area, each entry of the table indicating properties of a respective one of the jobs,
wherein, in response to manual input, each tabbed pane in the second displayable area is selectable, and wherein the third displayable area depicts the table of information corresponding to each job scheduled for the channel corresponding to whichever tabbed pane of the second displayable area is currently selected.

9. The operator console graphical user interface of claim 8 further comprising:
(d) a fourth displayable area depicting properties of a selected job, including information for scheduling execution of the selected job,
wherein, in response to manual input, each job listed in the third displayable area is individually selectable and wherein the fourth display area displays the properties corresponding to whichever job listed in the third displayable area is currently selected.

10. The operator console graphical user interface of claim 9 wherein one or more of the properties displayed in the fourth displayable area is modifiable in response to manual input.

11. The operator console graphical user interface of claim 3 further comprising:
(e) a third displayable area depicting properties of a selected job, including information for scheduling execution of the selected job,
wherein, in response to manual input, each solid line representing a job depicted in a selected, tabbed pane of the second displayable area is individually selectable and wherein the third display area displays the properties corresponding to whichever job corresponding to a solid line in the selected tabbed pane is currently selected.

12. The operator console graphical user interface of claim 11 wherein one or more of the properties displayed in the fourth displayable area is modifiable in response to manual input.

* * * * *

UNITED STATES PATENT AND TRADEMARK OFFICE
CERTIFICATE OF CORRECTION

| | | |
|---|---|---|
| PATENT NO. | : 7,636,306 B2 | |
| APPLICATION NO. | : 11/274371 | |
| DATED | : December 22, 2009 | |
| INVENTOR(S) | : Dougall et al. | |

It is certified that error appears in the above-identified patent and that said Letters Patent is hereby corrected as shown below:

On Page 2, on the Title Pg Item (56), under "U.S. PATENT DOCUMENTS", Line 30, after "Flohr et al.", insert -- 348/14.1 --.

On Page 2, on the Title Pg Item (56), under "U.S. PATENT DOCUMENTS", Line 71, after "Yanagihara", insert -- 386/95 --.

In Fig. 21, Sheet 12 of 17, for Tag "S114", in Line 3, delete "4" and insert -- & --, therefor.

In Column 1, Line 10, insert -- The subject matter of this application is related to the subject matter of the following patent applications, all of which are commonly assigned to the same assignee as is this application: --, as a new Paragraph.

In Column 12, Line 18, delete "primary:" and insert -- primary --, therefor.

In Column 13, Line 49, delete "5024" and insert -- 502-4 --, therefor.

In Column 17, Line 9, delete "7064" and insert -- 706-4 --, therefor.

In Column 17, Line 12, delete "7064" and insert -- 706-4 --, therefor.

In Column 21, Line 27, delete "plug-in's" and insert -- plug-ins --, therefor.

In Column 21, Line 62, delete "91 1" and insert -- 911 --, therefor.

In Column 22, Line 22, delete "www.ietforg/" and insert -- www.ietf.org/ --, therefor.

In Column 26, Line 24, delete "borker" and insert -- broker --, therefor.

In Column 26, Line 26, delete "Instep" and insert -- In step --, therefor.

Signed and Sealed this

Twelfth Day of October, 2010

David J. Kappos
*Director of the United States Patent and Trademark Office*